United States Patent
Adkins et al.

(10) Patent No.: US 7,421,791 B2
(45) Date of Patent: Sep. 9, 2008

(54) APPARATUS AND METHOD FOR HANGING A DOOR

(75) Inventors: Edward D. Adkins, Loves Park, IL (US); Damian A. Kozina, Rockford, IL (US)

(73) Assignee: Nomis LLC, Hampshire, IL (US)

( * ) Notice: Subject to any disclaimer, the term of this patent is extended or adjusted under 35 U.S.C. 154(b) by 63 days.

(21) Appl. No.: 11/444,636

(22) Filed: Jun. 1, 2006

(65) Prior Publication Data
US 2006/0272166 A1 Dec. 7, 2006

Related U.S. Application Data

(60) Provisional application No. 60/788,142, filed on Mar. 31, 2006, provisional application No. 60/686,657, filed on Jun. 1, 2005.

(51) Int. Cl.
*E04F 21/00* (2006.01)
*E05B 17/06* (2006.01)

(52) U.S. Cl. ......................................................... 33/197
(58) Field of Classification Search ................... 33/197, 33/194
See application file for complete search history.

(56) References Cited

U.S. PATENT DOCUMENTS

| | | | |
|---|---|---|---|
| 917,488 A | 4/1909 | Roberts | |
| 1,224,302 A * | 5/1917 | Johnson | 33/197 |
| 1,400,898 A * | 12/1921 | Murdock | 33/197 |
| 1,630,429 A * | 5/1927 | Hobbisiefken | 33/194 |
| 2,659,159 A * | 11/1953 | Jarrett et al. | 33/197 |
| 3,082,800 A * | 3/1963 | Soss | 33/197 |
| 3,206,861 A * | 9/1965 | Damijonaitis et al. | 33/197 |
| 4,058,902 A | 11/1977 | Hall | |
| 4,280,776 A | 7/1981 | Chaconas et al. | |
| 4,306,823 A * | 12/1981 | Nashlund | 33/197 |
| 4,715,125 A | 12/1987 | Livick | |
| 4,813,826 A * | 3/1989 | Riedel | 33/197 |
| 4,815,215 A | 3/1989 | Saylor et al. | |
| 5,042,543 A | 8/1991 | Carey | |
| 5,146,961 A | 9/1992 | Schoeller | |
| D335,089 S | 4/1993 | Grubelnik | |
| 5,222,845 A | 6/1993 | Goldstein et al. | |
| D346,337 S | 4/1994 | Carey | |
| 5,511,312 A | 4/1996 | Hobbs | |
| 5,524,684 A | 6/1996 | Stuckel | |
| D372,433 S | 8/1996 | Brutscher et al. | |
| 5,569,001 A | 10/1996 | Brutscher et al. | |
| 5,573,352 A | 11/1996 | Matadobra | |
| D395,246 S | 6/1998 | Carey | |
| 5,762,115 A | 6/1998 | Shouse | |
| D415,046 S | 10/1999 | Carey | |

(Continued)

OTHER PUBLICATIONS

Porter Cable Professional Power Tools, Porter Cable Hinge Butt Templet 59380 59381, manual, 1999, 1 page.

(Continued)

*Primary Examiner*—Christopher W Fulton
(74) *Attorney, Agent, or Firm*—Reinhart Boerner Van Deuren P.C.

(57) ABSTRACT

An apparatus and/or method for hanging a door in an associated frame are provided, through the use of one or more templates and/or guide devices including elements and features which facilitate proper positioning of mortises and/or holes in the door and door frame, for hinge and lock-set hardware.

31 Claims, 30 Drawing Sheets

U.S. PATENT DOCUMENTS

| | | |
|---|---|---|
| 6,077,001 A | 6/2000 | Fetzer |
| 6,343,632 B1 | 2/2002 | Zivojinovic |
| 6,910,837 B2 | 6/2005 | Trettin et al. |
| 6,954,989 B1 | 10/2005 | Morton |
| 6,994,498 B2 | 2/2006 | Trettin et al. |
| D516,401 S | 3/2006 | Snider et al. |
| 2003/0056331 A1 | 3/2003 | Garner |
| 2004/0182476 A1 | 9/2004 | Karkosch et al. |
| 2005/0105979 A1 | 5/2005 | Snider et al. |

OTHER PUBLICATIONS

Sears Craftsman, Butt Hinge Template Model 2564, manual, 4 pages.

* cited by examiner

APPARATUS AND METHOD FOR HANGING A DOOR

CROSS-REFERENCE TO RELATED PATENT APPLICATIONS

This patent application claims the benefit of U.S. Provisional Patent Application Nos. 60/686,657 filed on Jun. 1, 2005 and 60/788,142 filed on Mar. 31, 2006, the disclosures of which are incorporated herein in their entirety by reference.

FIELD OF THE INVENTION

The invention relates to an apparatus and method for hanging doors, and more specifically to apparatus and method for providing mortises and/or holes in a door and in a frame supporting a door, for hinge and lock-set hardware.

BACKGROUND OF THE INVENTION

In the past, many types of devices have been provided for positioning and guiding routers, drills, or other tools utilized for forming mortises along the edge of a door frame to receive the door hinges, and hardware associated with the lock-set, such as a strike plate. Various types of prior devises have also been provided for positioning and guiding drill bits and tools, such as hole saws, for use in making intersecting holes in the door for receipt and passage of the components of a lock-set. Some prior devices have incorporated template, guides, or other elements for forming both the required mortises, and holes in both the door and it's associated frame or jamb.

In general, prior devices and methods for providing mortises in a door and its associated frame have not been satisfactory, however.

Some prior systems are not sturdy enough for repeated use in both commercial and consumer applications. Some rely on a template base nailed to an edge of the door, or the frame, with one or more of a series of adapter plates or template inserts being secured to the template base by various methods. Although such an approach is workable, in theory, experience has shown that the provisions for attaching the inserts into the template base, in prior devices, is overly complex and/or often does not result in a secure enough connection to preclude loosening the parts in service, or over time, which then leads to unacceptable inaccuracy in the position and/or shape of the mortises and holes formed by the prior devices. Examples of such prior devices are shown by U.S. Pat. No. Des. 395,246 and 5,042,543 to Carey, and U.S. Pat. No. 6,954,498 to Trettin, et al. Some prior devices for installing hinges and lock-sets in doors, while providing an acceptable required degree of accuracy, are too complex in their construction, and/or undesirably expensive, particularly for use by a home owner by individuals not regularly occupied with the installation of doors. One such prior device is illustrated by a hinge-space butt template set, sold by the Porter-Cable company under their part numbers 59380 and 59381. Other examples of such devices are illustrated by U.S. Pat. No. 5,146,961, to Schoeller; U.S. Pat. No. 4,815,215, to Saylor et al.; U.S. Pat. No. D 516,401 S, to Snider et al.; U.S. Pat. No. 6,343,632 B1, to Zivojinovic; and U.S. Published Patent Application No. 2005/0105979 A1, to Snider et al.

What is needed, therefore, is an improved method and apparatus for installing doors in door frames. In particular, what is needed is an improved apparatus for providing properly positioned mortises and/or holes through a door and its associated doorjamb. It is particularly desirable that such an improved apparatus and method be amenable to either commercial, or a noncommercial use.

BRIEF SUMMARY OF THE INVENTION

The invention provides an improved apparatus and/or method for hanging a door in an associated door frame, through use of one or more templates and/or guide devices including elements or features providing significant advantage over prior devices systems, and methods for hanging doors.

In one form of the invention, an apparatus includes a template base adapted to mate with a door, or its associated frame, together with one or more template inserts adapted for attachment to the template base with turn-lock fasteners. The turn-lock fasteners may take a form consistent with structures disclosed in commonly assigned, published, U.S. Patent No. 2004/0182476 A1 to Karkosch et al., the entire disclosure which is incorporated herein by reference. Through use of such turn-lock fasteners, the template inserts of the invention are attached to the template base in a more secure fashion than was provided by prior devices for use in hanging doors.

In some forms of the invention, an apparatus includes a base, according to the invention, together with a plurality of templates adapted for attachment to the template base, for use in guiding routers, drills, or other appropriate power and hand tools for forming mortises and/or holes in a door or its associated doorjamb. Templates may be provided for forming all holes and mortises, etc., required for attachment of a wide variety of functional and decorative hardware, relating to doors and hanging of doors, including, but not limited to: passage lock sets; dead bolt lock sets; hinges; strike plates; and escutcheons.

An apparatus, according to the invention, may further include elements for aligning multiple template bases, together with their associated templates, in a proper orientation and alignment for forming one or more lock-set openings, and multiple mortises for hinges, strike-plates, etc., on a door and/or its associated door jamb.

In some forms of the invention, the elements for aligning multiple template base plates may include one or more bars, for use in connecting adjacent templates. Such bars may be provided in multiple sections, and may be connected together by releasable connections, so that the apparatus may be broken down to a convenient size for storage and transport. The bars may also be adjustable in length to allow for use of the apparatus in doors of different heights and widths. The apparatus may also include stops at one or both ends of such bars, for use in aligning the template base on the door and/or its associated jamb. The stops may have a thickness selected to automatically provide a desired clearance between the top and/or the bottom of the door, and an adjacent position of the door frame or floor under the door.

In other embodiments of the invention the elements for aligning multiple template bases may include one or more lasers, for positioning the multiple template bases with respect to one another. In one form of the invention, one or more of the lasers is operatively attached to a template base used for installing the lock-set in a door, with the laser providing a means for locating one or more additional template base plates used for forming mortises in the door for receipt of a leaf of a door hinge used for connecting the door to the door jamb. One of more of the template bases may also include a fiber optic receiver which lights up when the base plate is properly aligned with the beam omitted by the laser.

In forms of the invention utilizing one or more laser for alignment, an apparatus according to the invention, may include multiple lasers, and template bases may include multiple fiber optic receivers, to accommodate various widths and heights of doors, and doors hinged on either the right or the left side.

In some forms of the invention, templates are provided for forming a large hole, extending through the faces of the door, for passage of a lock-set. These templates may be attached to a template base according to the invention by slide-lock fasteners. These templates may also include elements for adjusting the location of the center of the through-hole from the edge of the door. Such adjustment elements may include a moon-shaped insert. The moon-shaped insert may be adapted for attachment to the template in such a manner that the moon-shape insert is flush with a surface of the template when installed therein.

In some forms of the invention, a template base may include one or more grooves, therein, for receiving template, inserts, and/or other elements of an apparatus according to the invention, to facilitate storage of the apparatus when the apparatus is not in use. An apparatus according to the invention, may include multiple template bases, which are identical to one another, and functionally interchangeable.

An apparatus, according to the invention, may also include one or more door supports, to facilitate holding and/or positioning of the door during formation of the mortises and/or holes in the door or its associated door jamb, during hanging of the door.

The invention may also take the form of a method for manufacturing or using an apparatus according to the invention.

In one form of the invention, a method is provided for locating the mortises for hinges along an edge of the door, with respect to a lock-set opening disposed along an opposite edge of the door. The method may include attachment of an apparatus including lasers, according to the invention, to the lock-set side of the door, and utilizing one or more laser attached to the apparatus on the lock-set side of the door for indicating proper positioning of the hinge mortises on the opposite side of the door. An apparatus and/or method, according to the invention, utilizing a laser, may further include providing appropriate mounting of the laser for adjustment thereof to indicate proper placement of hinge mortises on the opposite end of the door, taking into account the width, and/or height of the door.

The invention may take the form of an apparatus for hanging a door, having a face and an edge of the door, in an associated door frame, having a face and an edge of the door frame. Such an apparatus may include a template base, a first template, and a second template. The template base may have a mounting surface adapted for alternatively engaging the edge of the door when the template base is mounted on the door, and the face of the frame when the template base is mounted on the door frame. The first template may be adapted for mounting on the template base, for guiding a tool engaging the edge of the door, when the template base is mounted on the edge of the door, and for guiding a tool engaging the face of the door, when the template base is mounted on the face of the door frame. The second template may extend substantially perpendicularly from the template base, for guiding a tool engaging the face of the door, when the template base is engaging the edge of the door. At least one of the first or second templates may include a slot therein, for receiving the hooked end of a tape measure, to thereby facilitate positioning the template base.

An apparatus, according to the invention, may also include an alignment apparatus for positioning the template base on the door or the door frame. The alignment apparatus may include an interconnecting bar device, which is selectively extendable and includes a stop for aligning the template base on the door and the door frame.

An apparatus, according to the invention, may include multiple template bases, together with their associated first and second templates, and an alignment apparatus for positioning the multiple template bases with respect to one another and either the door or the door frame, respectively, when the multiple template bases are attached to the door or the door frame.

In some forms of an apparatus, according to the invention, the second template may include an inclined surface, and the apparatus may further include a generally wedge-shaped positioning member, slidably mounted on the incline surface for movement between a first and a second position along the inclined surface. The positioning member may have a first inclined surface thereof, engaging the inclined surface of the second template, and a second non-inclined surface thereof, oriented substantially perpendicular to the mounting surface of the template base, for engaging the face of the door when the template base is engaging the edge of the door. The positioning member may include a selectively disengageable snap-action latch, for holding the positioning member in the first and second positions. Movement of the positioning member along the inclined surface of the second template may move the second template toward or away from the face of the door, when the non-inclined surface of the positioning member is in engagement with the face of the door. Movement of the positioning member along the inclined surface of the second template may move the first template laterally across the edge of the door, when the non-inclined surface of the positioning member is in engagement with the face of the door. The non-inclined surfaces of the wedge-shaped members may define a faying surface of the apparatus, which is adapted for mating with a face and/or edge of the door or a door frame.

An apparatus, in accordance with the invention, may include a spacer, pivotably mounted to the template base for selective movement between a first and a second position. The spacer may be configured and attached to the template base in such a manner that when the spacer is pivoted into the second position, the spacer will protrude from the template base and define a second mounting surface of the template base, to thereby move the template base farther from the door edge, when the second mounting surface is engaging the door edge, or for moving the template base farther from the face of the door frame, when the second mounting surface is engaging the face of the door frame. The spacer may define a faying surface, adapted for mating with the face or edge of the door and/or door frame, in both the first and second positions of the spacer.

First and second templates, according to the invention, may include openings therein for guiding tools forming intersecting first holes in the door edge and door face respectively, for installation of a lock set, with the second template also including an alignment opening extending therethrough, for marking a first vertical location of the apparatus on the door and door frame. An apparatus, according to the invention, may further include a dead bolt lock location guide, for facilitating marking of a desired vertical spacing for the dead bolt lock relative to the alignment opening in the second template. The dead bolt lock location guide may include indicia for marking two or more desired vertical spacings for the dead bolt lock relative to the alignment opening in the second template. The dead bolt lock location guide may be detachable from the template base and first and second templates, in an apparatus according to the invention.

In one form of the invention, a method is provided for hanging a door, having a first surface thereof, in an associated door frame, having a first surface thereof. The method may include positioning a template, for forming a mortise and/or hole in the surface of the door and/or frame, with respect to the surface of the door and/or frame, using a spacer mounted on the apparatus for pivoting movement from a first to a second position of the spacer. The spacer may be configured and attached to the apparatus in such a manner that when the spacer is pivoted into the second position, the spacer will protrude in a manner moving the template farther from the first surface, when the spacer is engaging the first surface.

Where the door includes a second surface thereof extending substantially perpendicular to the first surface thereof, and the door frame includes a second surface thereof extending substantially perpendicular to the first surface thereof, a method, according to the invention, may further include moving the template across the second surface of the door and/or the second surface of the door frame, by moving a spacer, according to the invention, from the first to the second position, and bringing the spacer into engagement with the respective first surface of the door and/or the first surface of the door frame.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
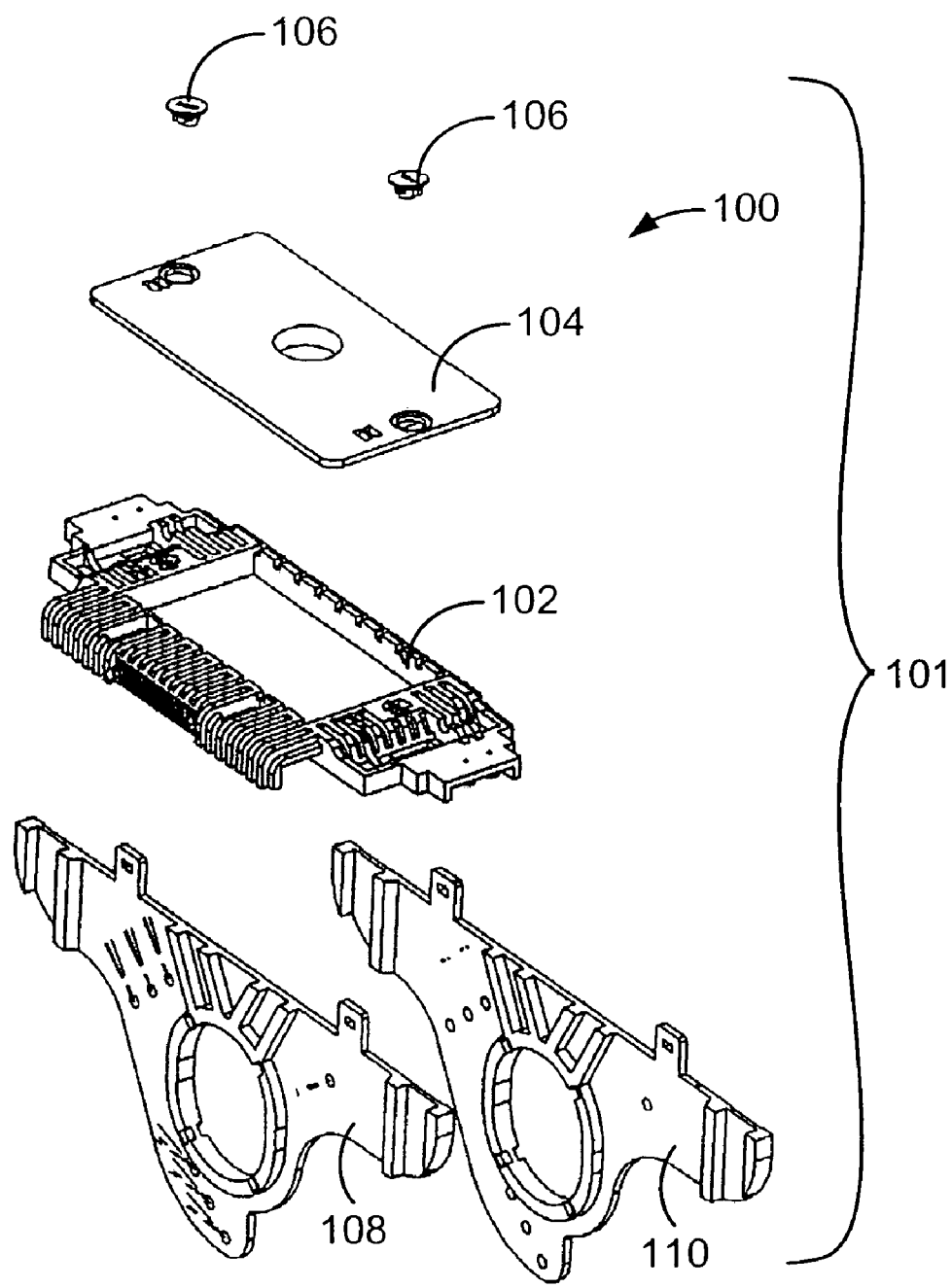
FIGS. 1-14 illustrate a first exemplary embodiment of the invention, in a form of an apparatus for forming mortises and holes for a lock-set on a door and its associated jam, through the use of multiple template bases, according to the invention, positioned on the door, and/or against the frame, by adjustable guide rods.

FIG. 1 illustrates a first exemplary embodiment of an apparatus 100, according to the invention, including a template base 102, a template insert 104, turn-lock fasteners 106, and door lock hole templates 108, 110. The template insert 104 is attached to the template base 102, in the exemplary embodiment, by the turn-lock fasteners 106 in the manner illustrated in FIGS. 2 and 3. The first and second door lock templates 108, 110 are also attached to the template base 102, with slide lock fasteners, in the manner described in more detail below, or any other appropriate manner, to provide a structure for guiding a drill and hole saw to form intersecting holes along one edge of a door for insertion and passage therethrough of a lock-set (not shown).

Figure 4:
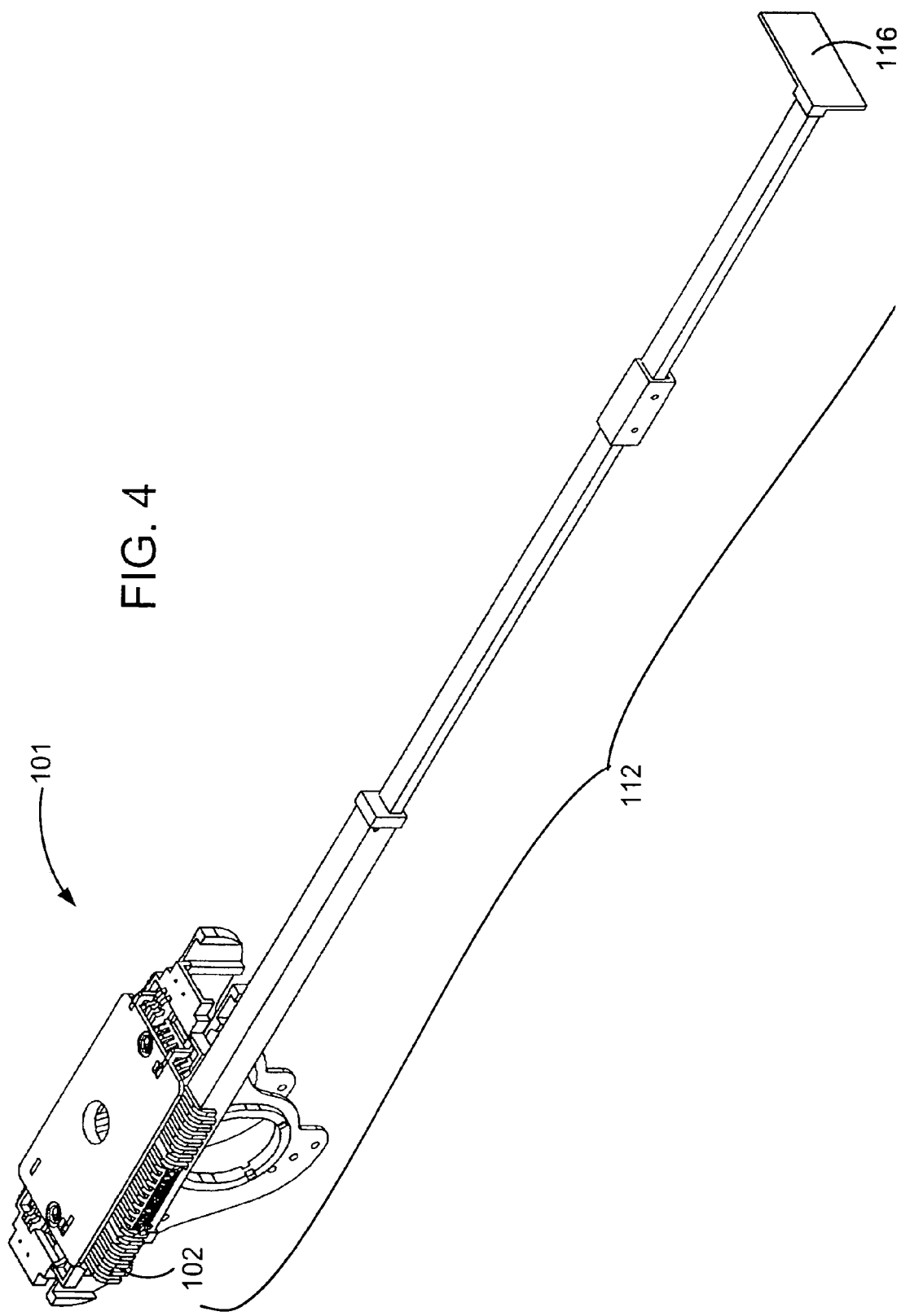
Figure 5:
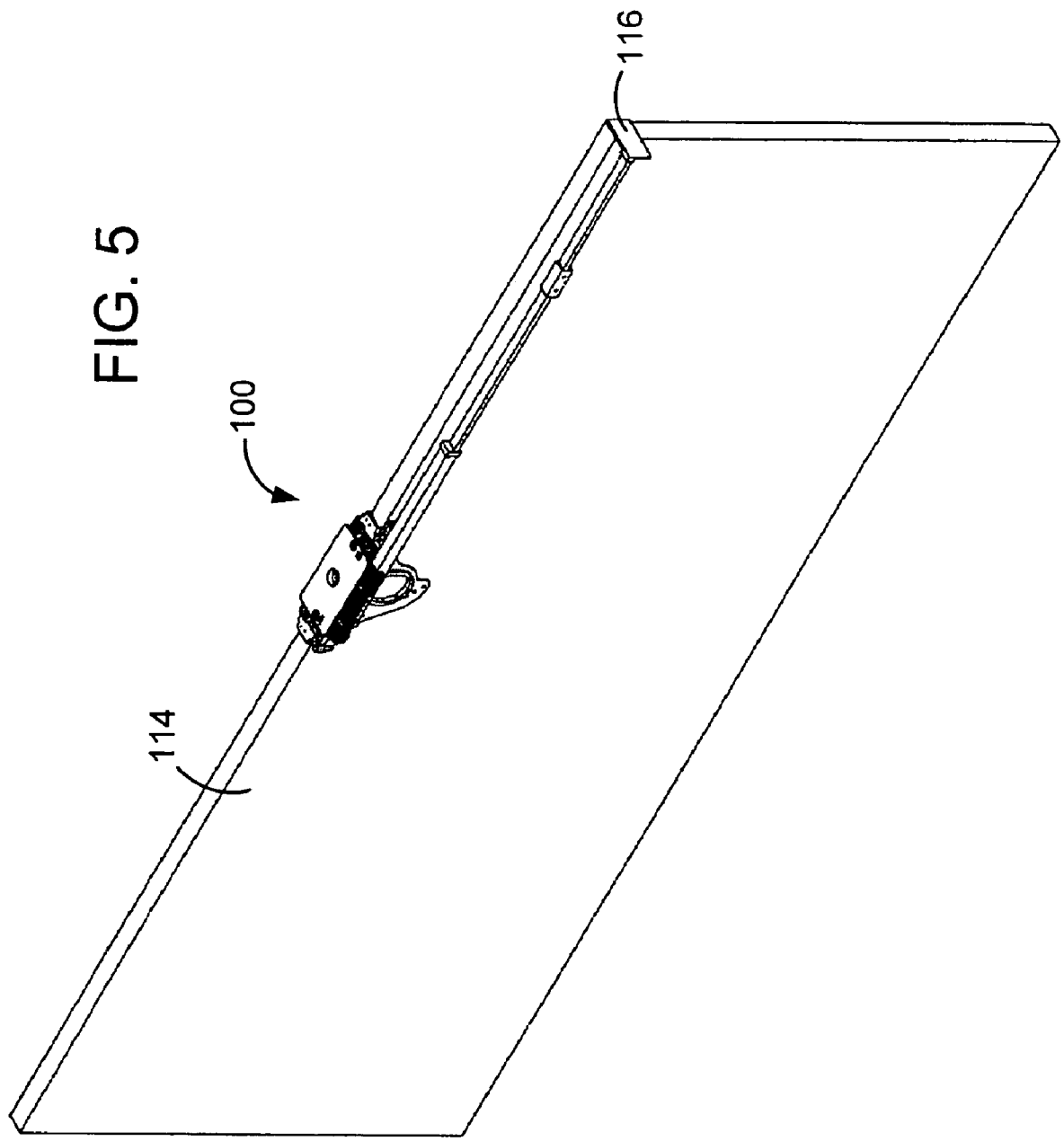

As shown in FIG. 4, the exemplary embodiment of the apparatus 100 may further include an adjustable length leg 112, adapted for attachment to a groove in the template base 102 of the lock-set template 101, so that the apparatus 100 may be attached to a door 114 for positioning the intersecting holes for passage of the lock-set on the door 114. The template base 102 is adapted for attachment to an edge of the door 114 by a pair of nails (not shown) which are driven into the edge of the door to secure the lock-set template 101 at a desired distance from the end of the door 114. The adjustable length leg 112 includes a foot 116 thereof which can be hooked over one end of the door 114, in the manner shown in FIG. 5, to allow the lock-set template 101 to be effectively and efficiently utilized for forming the lock-set holes in multiple doors all having the lock-set positioned at a uniform distance from the end of the door 114.

Figure 2:
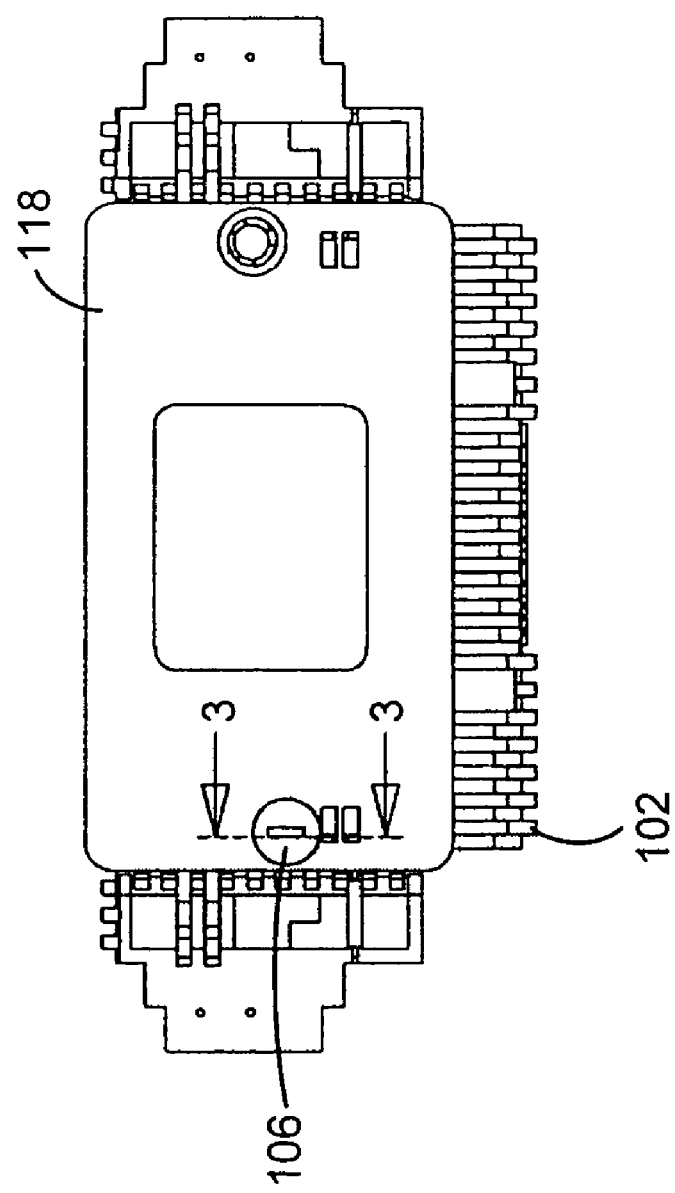
Figure 3:
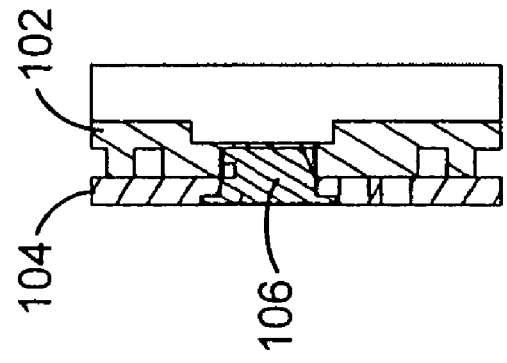

As shown in FIG. 2, the exemplary embodiment of the lock-set template 101 of the apparatus 100 may also include an alternate template insert 118, which may be attached to the template base 102 in place of the template insert 104, for guiding a router or other tool in formation of a mortis around the latch of the door latch mechanism.

Figure 6:
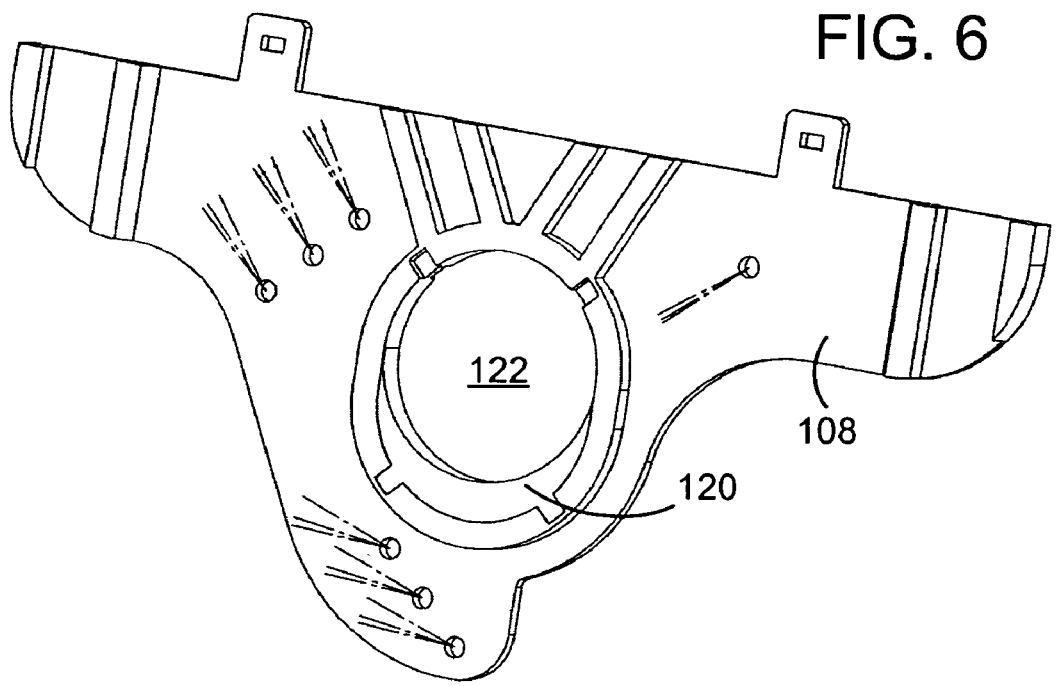
Figure 7:
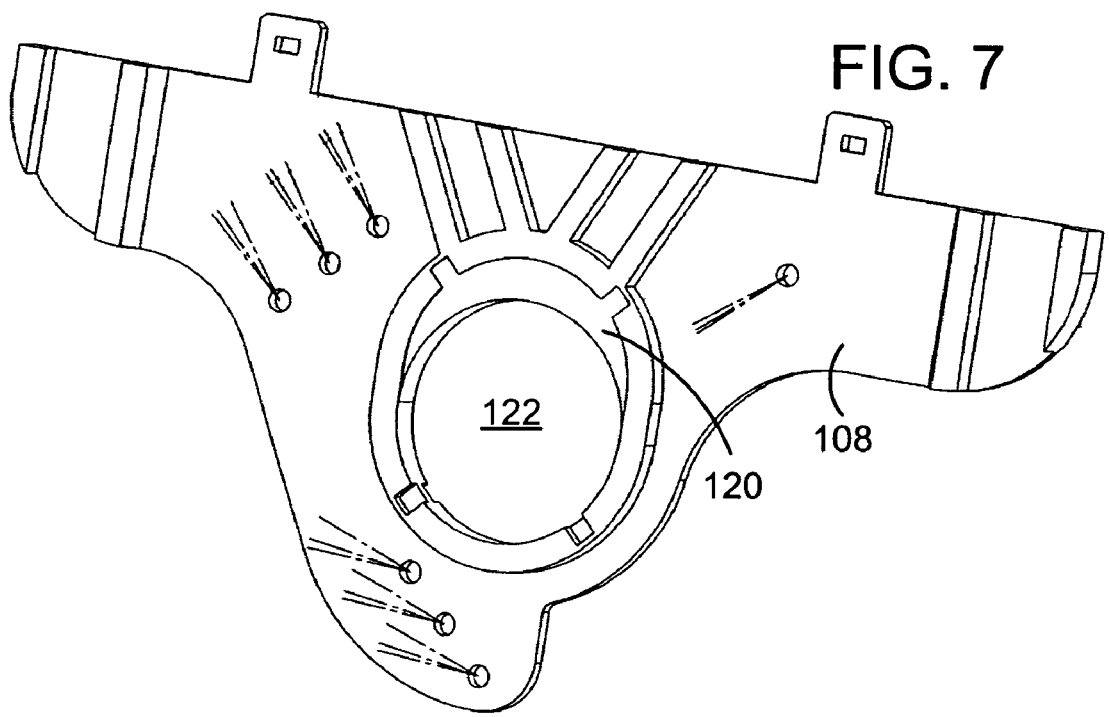

As shown in FIGS. 6 and 7, the exemplary embodiment of the apparatus 100, according to the invention, also includes a moon-shaped insert 120 which may be moved to opposite ends of a racetrack-shaped hole 122 in the door lock hole templates 108, 110, to thereby adjust the position of a large through-hole in the door 114, for passage of a portion of the lock-set, with respect to the edge of the door 114.

Figure 8:
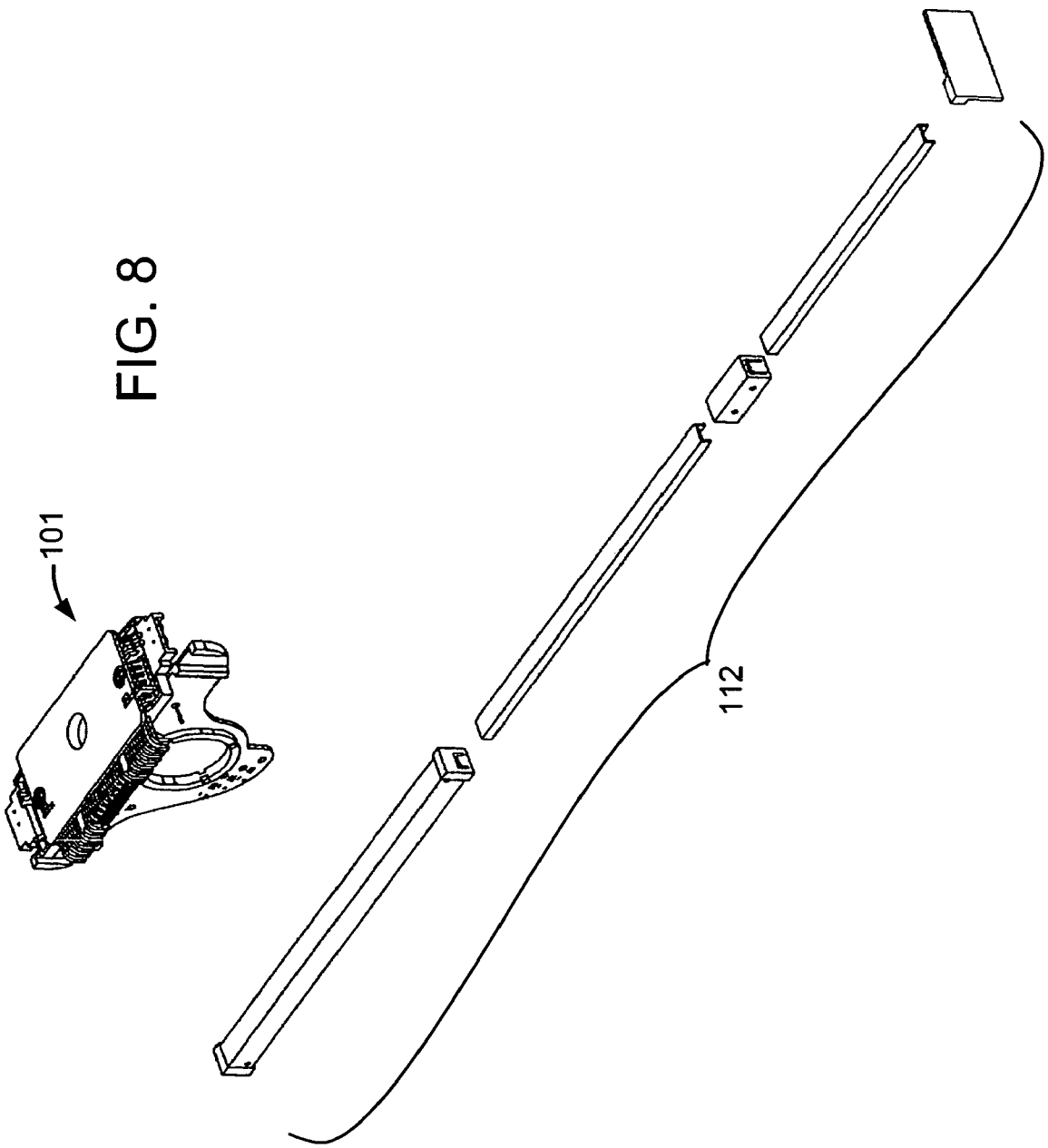

FIG. 8 shows construction details of the adjustable length leg 112 of the first exemplary embodiment of the apparatus 100, according to the invention.

Figure 9:
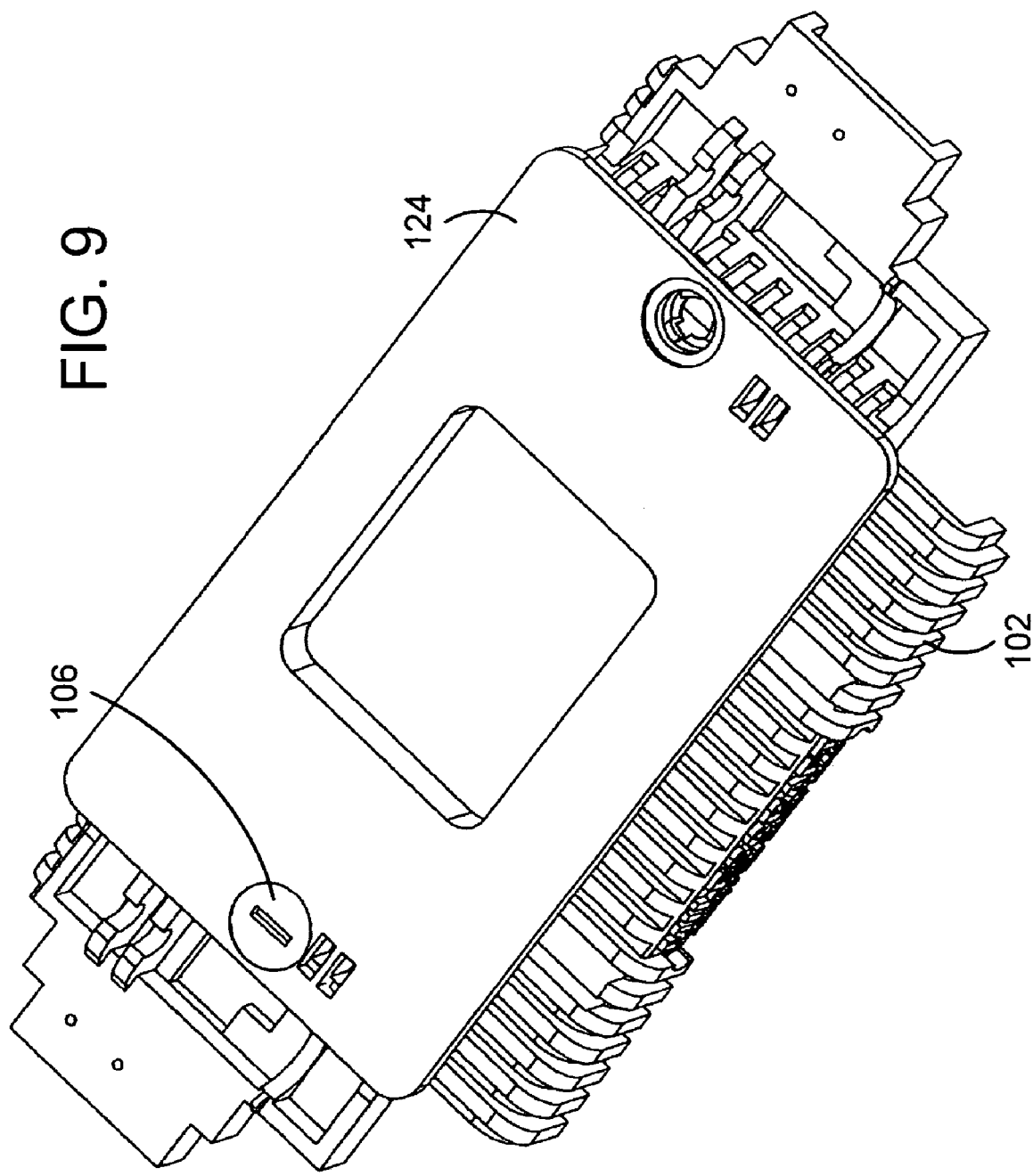
Figure 10:
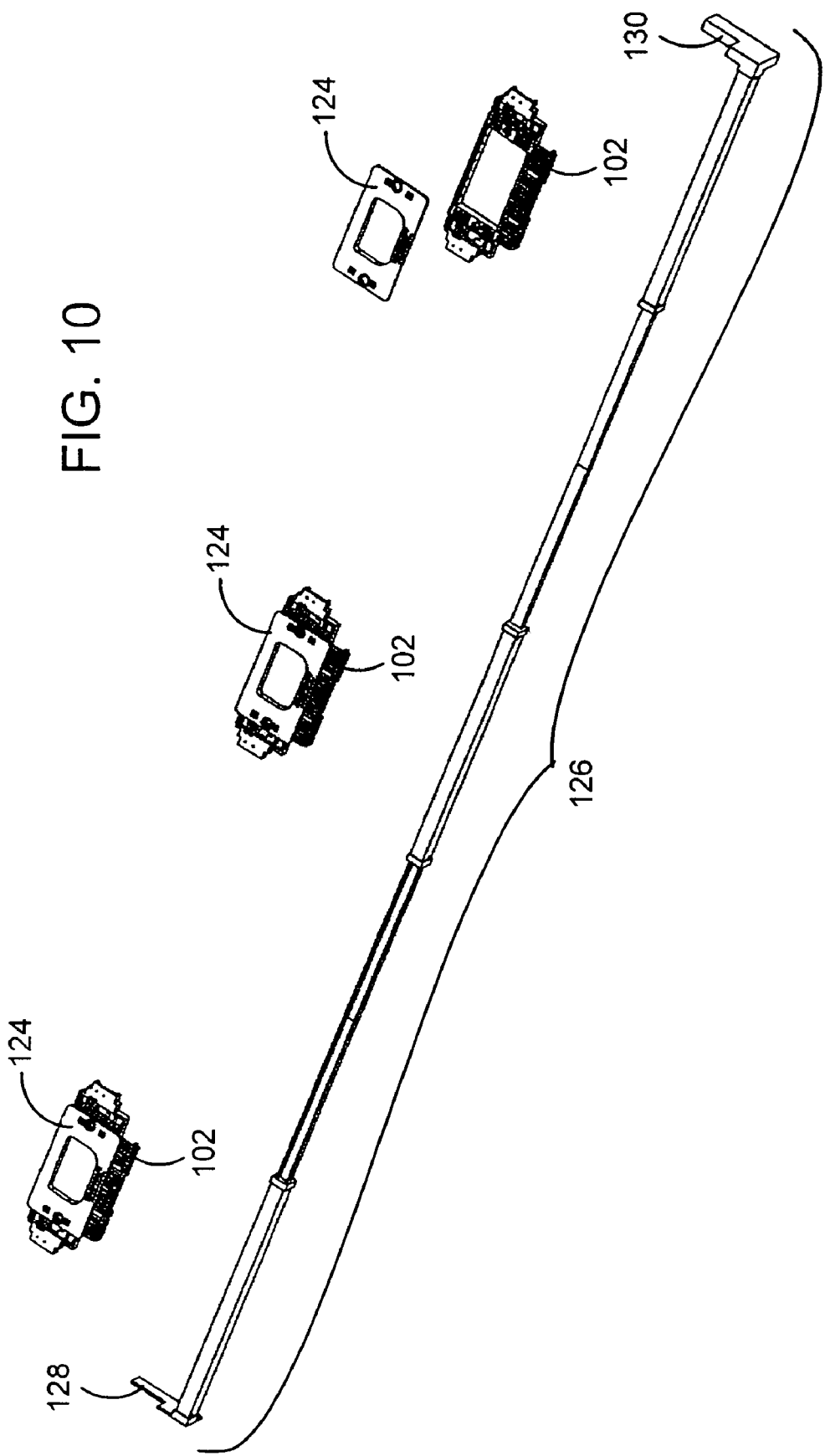
Figure 11:
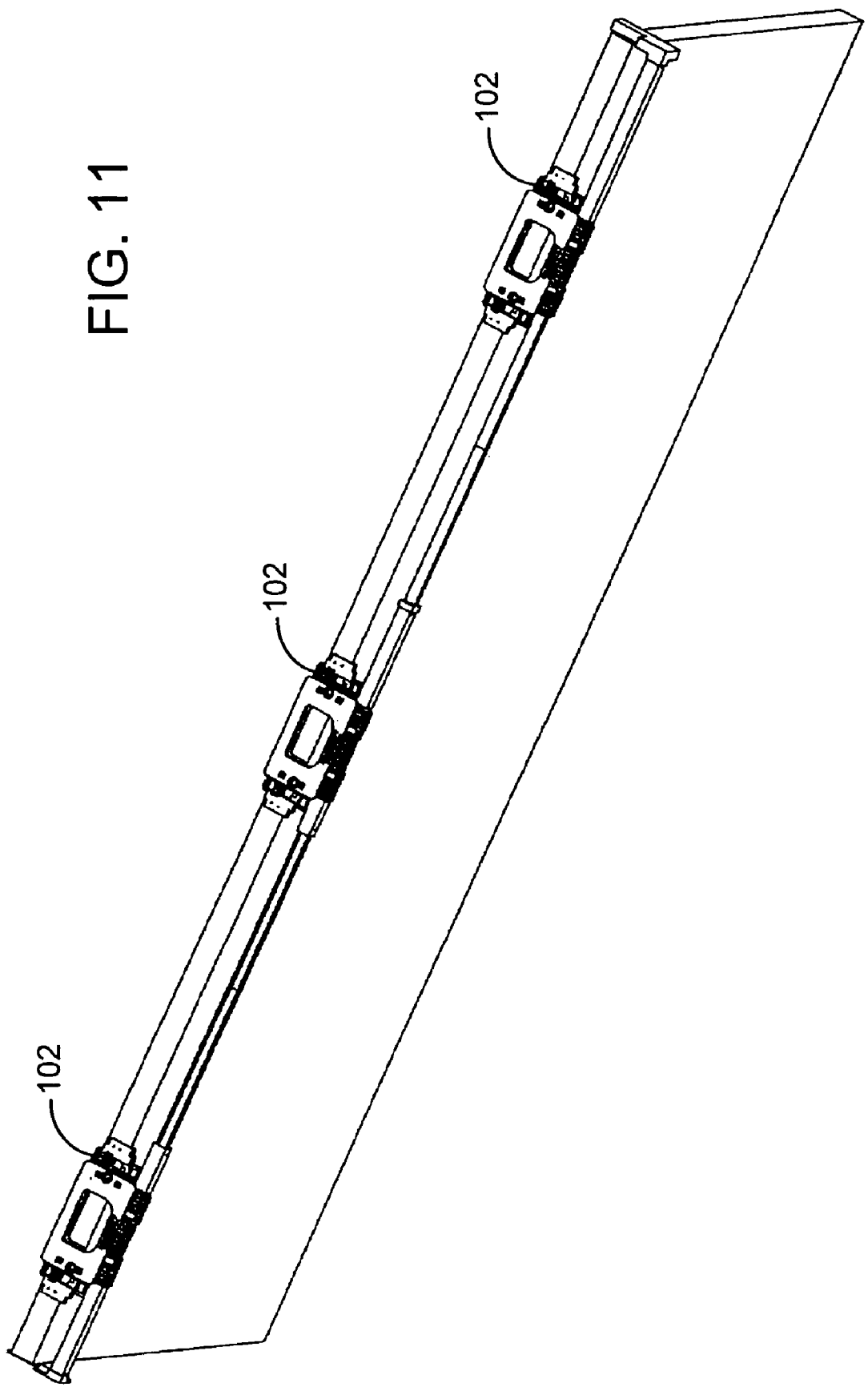

As shown in FIGS. 9 and 10, the first exemplary embodiment of an apparatus 100, according to the invention, also includes two additional template bases 102 having hinge template inserts 124 attached thereto by turn-lock fasteners 106, in the manner described above in relation to the lock-set template 101. The three template bases 102, shown in FIG. 9, are connected together by an alignment apparatus 126, in the form of a hinge-side adjustable length leg, which includes a top and a bottom foot 128, 130, for positioning the alignment apparatus 126 along the hinge-side of the door 114, in the manner shown in FIG. 11.

Construction details of several parts of the hinge-side adjustable length leg 126 are shown in FIGS. 10, and 12-14. Specifically, as shown in FIGS. 10 and 12-14, the hinge-side adjustable length leg alignment apparatus 126 includes a first tubular end section 132, a second tubular end section 134, a center tubular section 136, and first and second U-shaped connection sections 138, 140.

Figure 14:
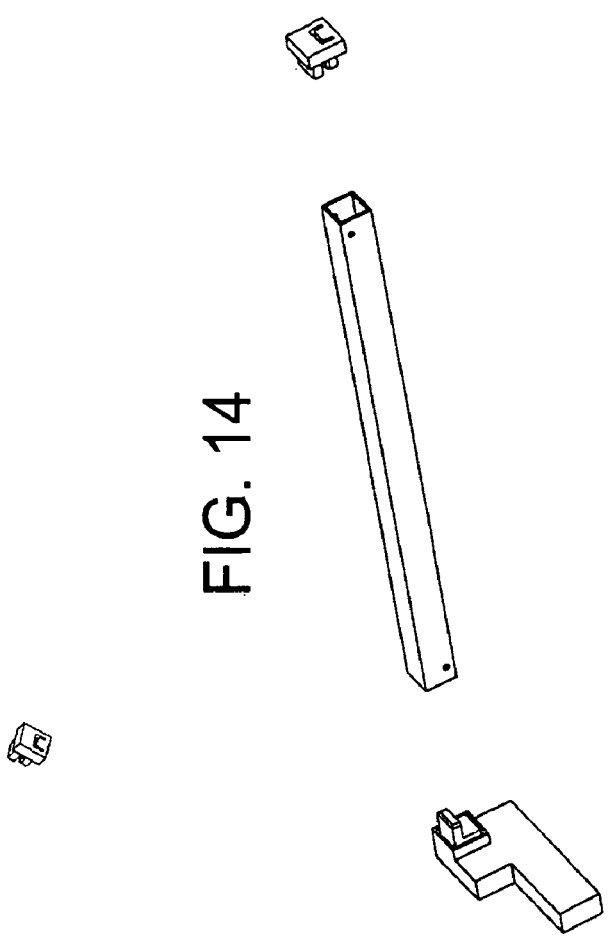
Figure 12:
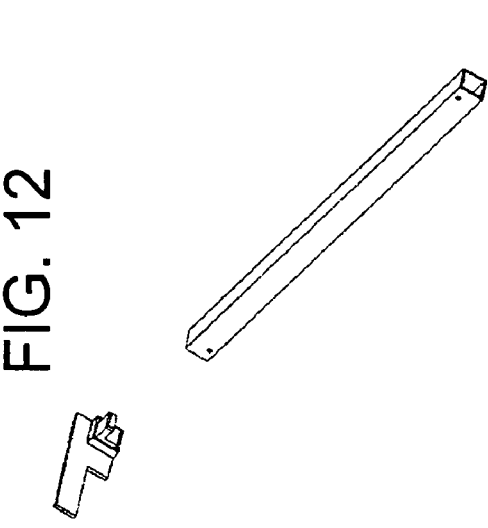

As shown in FIGS. 12 and 14, the outer ends of the first and second tubular end sections of the alignment apparatus 126 have attached respectively thereto the top foot 128 and bottom foot 130.

Figure 13:
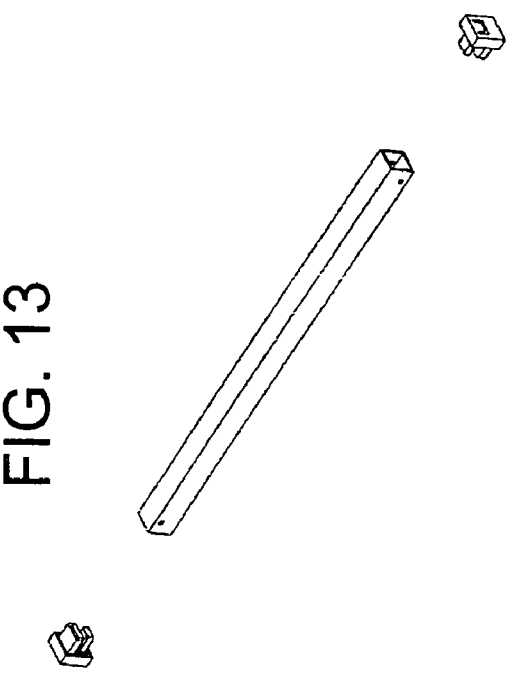

As shown in FIGS. 12-14, channel guides 142 are inserted into and attached to the opposite ends of the first and second tubular end sections 132, 134, and both ends of the center tubular section 136, of the alignment apparatus 126. Each of the channel guides 142 includes a channel shaped opening 144 therein, for receiving an end of one of the first or second U-shaped connection sections 138, 140, and a guide bar 146 extending into the tubular sections 132, 134, 136, for guiding the U-shaped connection sections 138, 140 within the interior of the tubular sections 132, 134, 136.

As will be understood from an examination of FIG. 10, and FIGS. 12-14, the channel guides 142 in opposite ends of the center tubular section 136 are attached with the channel-shaped openings 144 oriented oppositely from one another, so that the first and second U-shaped connection sections 138, 140 may pass by one another within the body of the center tubular section 136. The channel guides 142 and the first and second tubular end sections, 132, 134 are also oppositely oriented, to correspond with the orientation of the channel guides 142 and the center tubular section 136, such that when the alignment apparatus is assembled, as shown in FIG. 10, the legs of the first U-shaped connection section 138 are directed upward, as shown in FIG. 10, and the legs of the second U-shaped connection section 140 are oriented downward, with the alignment apparatus 126 oriented as shown in FIG. 10. By virtue of this arrangement, it will be recognized, by those having skill in the art, that the exemplary embodiment of the alignment apparatus 126, according to the invention, can be readily adjusted lengthwise, to allow use of the apparatus 100 on doors having a wide range of lengths.

It will also be recognized, by those having skill in the art, that the first exemplary embodiment 100 of an apparatus, according to the invention, can be utilized with, or without the alignment apparatus 126 to facilitate formation of hinge mortises on the door frame 115, into which the door 114 is installed.

To facilitate proper positioning of the templates on the door frame 115, it is contemplated that the top and bottom feet 128, 130, of the exemplary embodiment of the invention be configured to have a thickness 148, from inside and outside contacting surfaces thereof, which is equal to a desired clearance between the top and/or bottom of the door frame 115 and the corresponding top and/or bottom edge of the door 114. For example, it may be desirable for the top foot 128 to have a thickness, such as ⅛ of an inch, so that when the alignment apparatus 126 is removed from the door 114, after formation of the hinge mortises on the door with the inside surface of the top foot 108 bearing against the top edge of the door 114, the alignment apparatus 126, with appropriate templates attached thereto, can simply be moved to the door frame 115 and positioned with the outer surface of the top foot 128 contacting the inside top surface of the frame 115. The template bases 102 and hinge template inserts 124 will then be properly positioned to correspond with the mortises cut in the hinge side of the door 114, with the thickness 148 of the top foot 128 providing the desired ⅛" spacing between the top edge of the door 114 and the inside top surface of the door frame 115.

In similar fashion, it may be desirable to have the bottom foot 130 have a greater thickness, such as ¾-1½ of an inch to space the bottom surface of the door 114 a desired distance up from the floor.

FIGS. 15-22 illustrate a second exemplary embodiment of an apparatus 200 and a method for hanging a door 114 in a frame 115, through use of a lock-set template 101, and additional hinge-side template assemblies 202 which are positioned with respect to the lock-set template 101 by three laser pointers 204 attached to one of the door lock hole templates 108, 110 of the lock-set template assembly 101. Those having skill in the art, will recognize that the lasers 204 allow elimination of the adjustable-length legs 112 or 126, of the first embodiment of the apparatus 100, described above.

Figure 21:
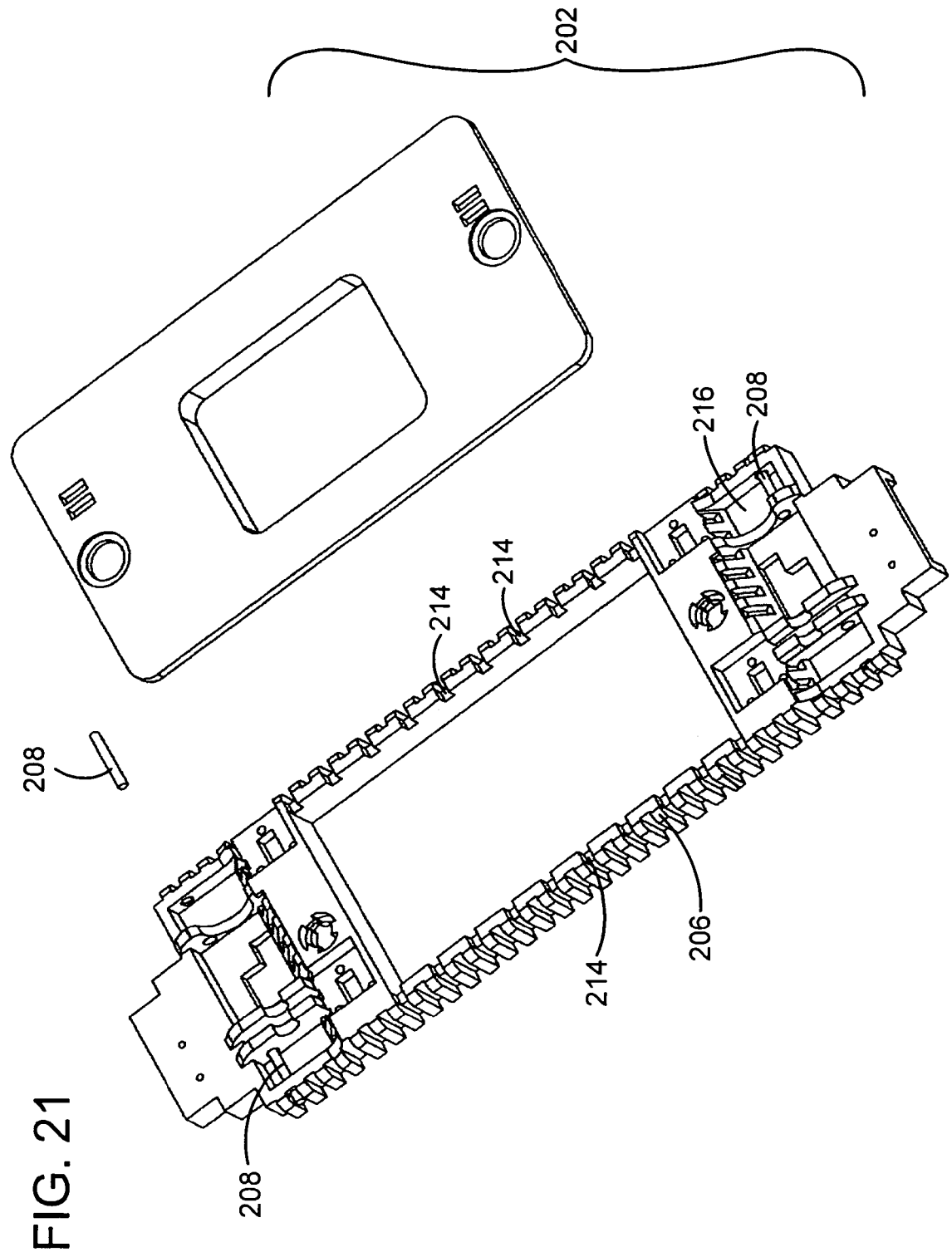

As shown in FIG. 21, the hinge-side template assemblies 202, of the second exemplary embodiment of the apparatus 200, include a template base 206, having one or more laser receivers 208, in the form of a plastic rod, fiber optic cable, or other appropriate materials such as Tritium, which light up when properly aligned with a beam emitted by one of the lasers 204. In utilizing the second embodiment of the apparatus 200, the lock-set template 101, is first positioned at a desired height, such as a standard height of 36" from the bottom of the door 114, for example, and affixed to one edge of the door 114 by a pair of nails driven through the template base 102 of the lock-set template assembly 101. The laser pointers 204 are then attached to one or the other of the door lock hole templates 108, 110, and aligned with indicia 205, or other mounting features, on the door lock hole templates 108, 110 corresponding to the widths and height of the door 114.

Figure 15:
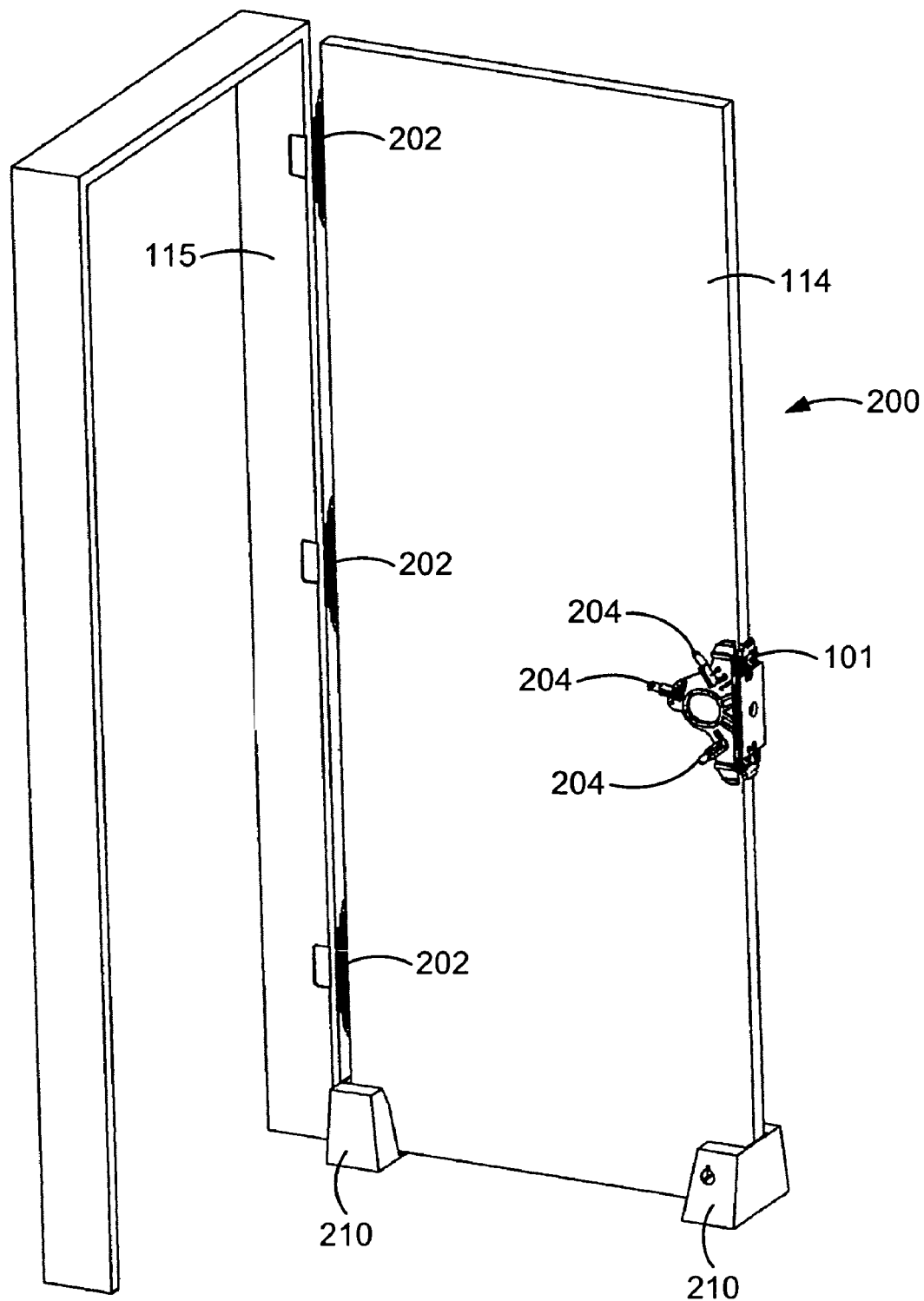
FIGS. 15-22 illustrate a second exemplary embodiment of an apparatus, according to the invention, which utilizes one or more lasers for positioning several template bases, according to the invention, with respect to one another.
Figure 17:
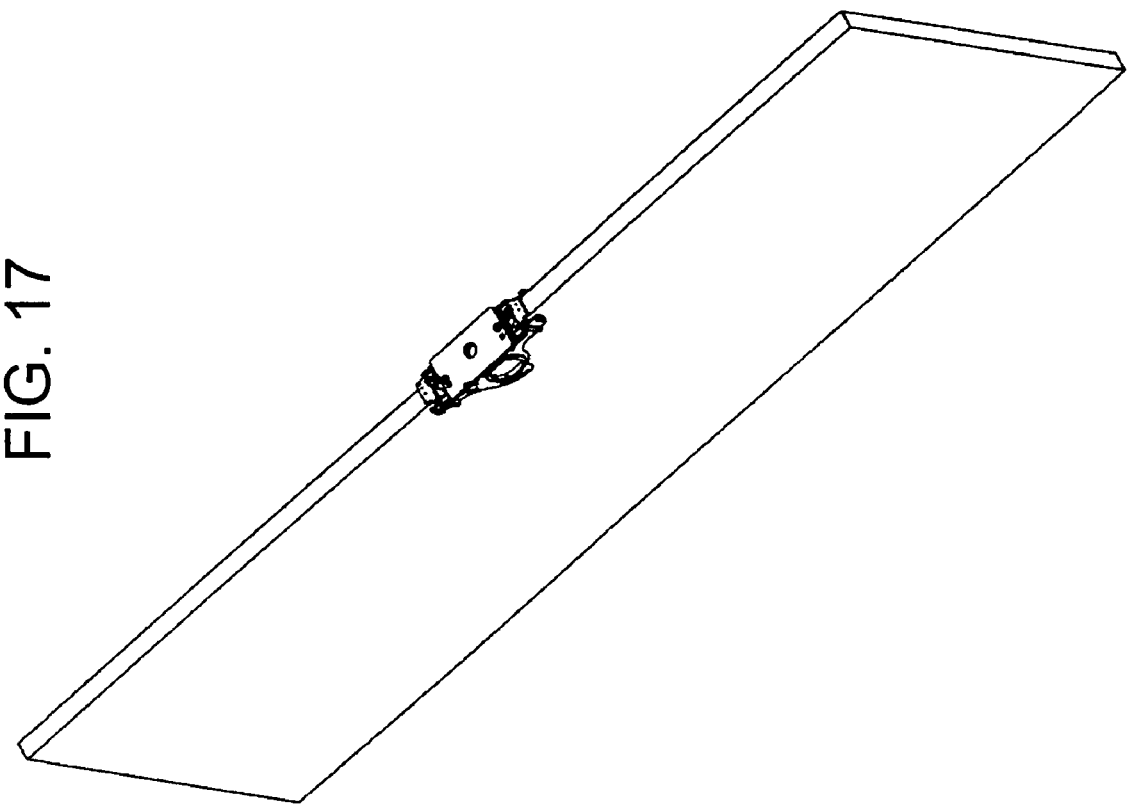
Figure 16:
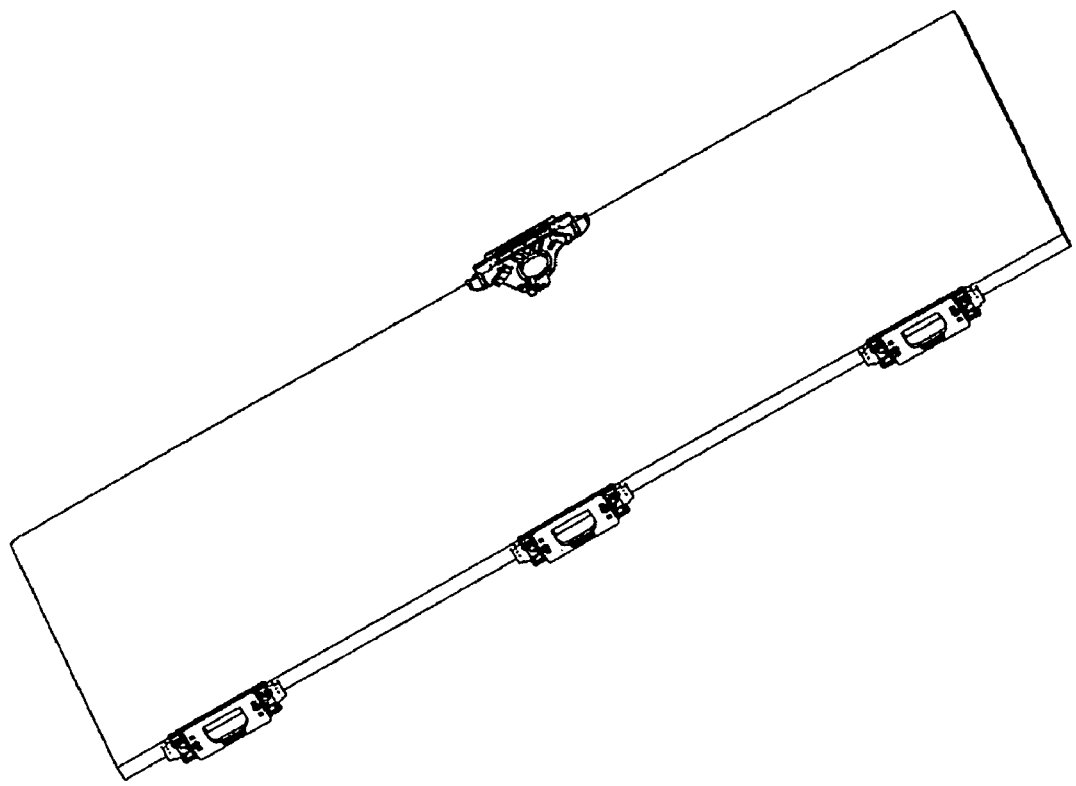
Figure 19:
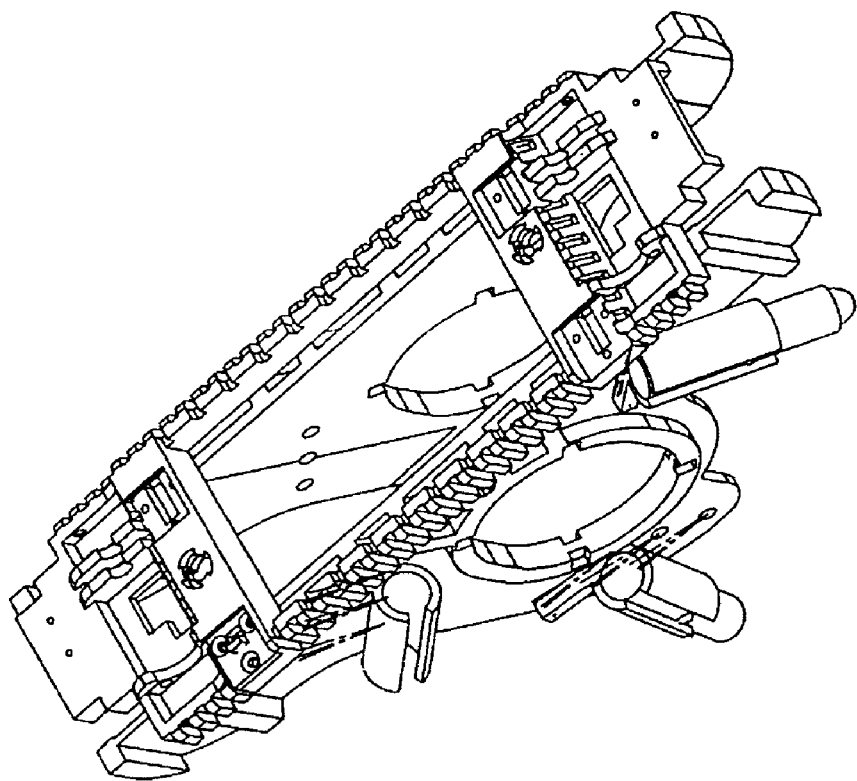
Figure 18:
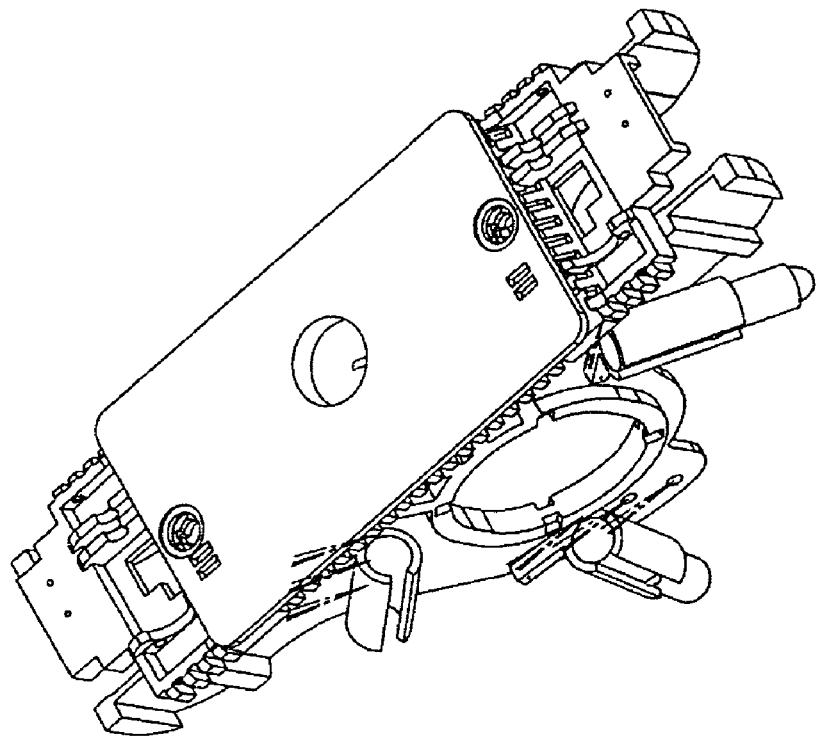

To facilitate attachment of the apparatus 200 to the door 114, the door may be mounted in support blocks 210, of the apparatus 200, in the manner shown in FIG. 15, so that the door 114 is supported in an upright position.

The hinge-side template assemblies 202 are then placed against the opposite edge of the door 114, on the hinge-side of the door 114, and moved up or down until the appropriate laser receiver 208 is illuminated by the beam from the laser pointer 204. The hinge-side template 202 is then anchored in place on the hinge-side of the door 114 by a pair of nails.

When all of the template assemblies 101, 202, are properly positioned, the mortises and holes may be formed in the door 114 using appropriate tools.

After the mortises and holes have been formed in the door 114, the door may be moved into a position, as shown in FIG. 15, adjacent the doorframe 115, and the position of the hinge-side template assemblies 202 marked onto the door frame 115. The hinge-side template assemblies 202 are then removed form the hinge side of the door 114 and secured to the doorframe 115, at the marked positions, for use in forming the mortises in the doorframe 115 for receiving the second leaf of hinges connecting the door 114 to the doorframe 115.

Figure 20:
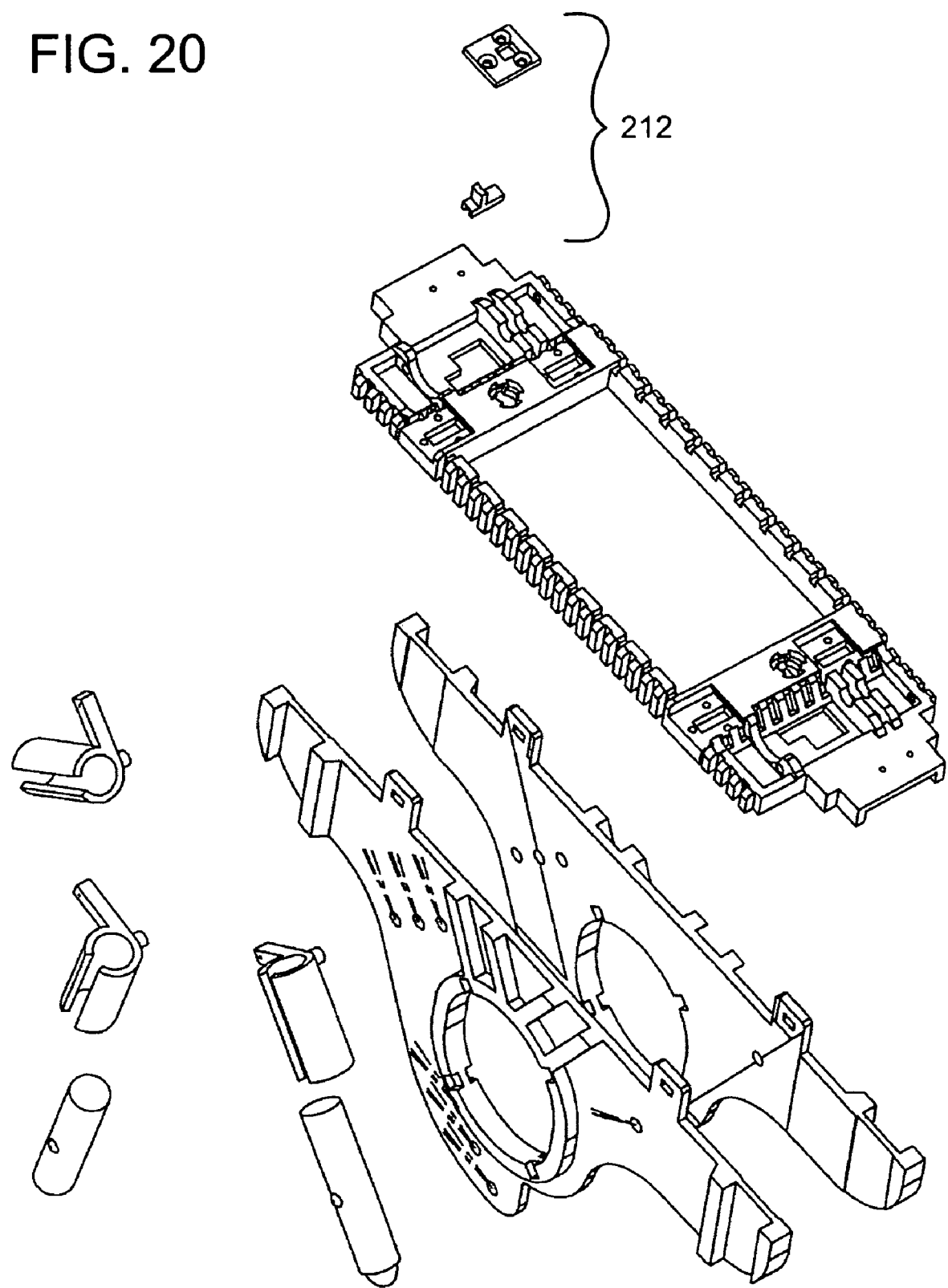

FIG. 17-20 are pictorial illustrations of various structural details of the second embodiment of the apparatus 200. FIG. 20 illustrates a slide lock apparatus 212, of the exemplary embodiments 100, 200 of an apparatus according to the invention, which may be used for securing the door lock hole templates 108, 110 to the template base 102. Those having skill in the arts, will recognize, however, that in other embodiments of the invention the various elements of the exemplary embodiments, or other embodiments of the invention may be attached to one another by various types of other appropriate means and mechanisms.

Figure 22:
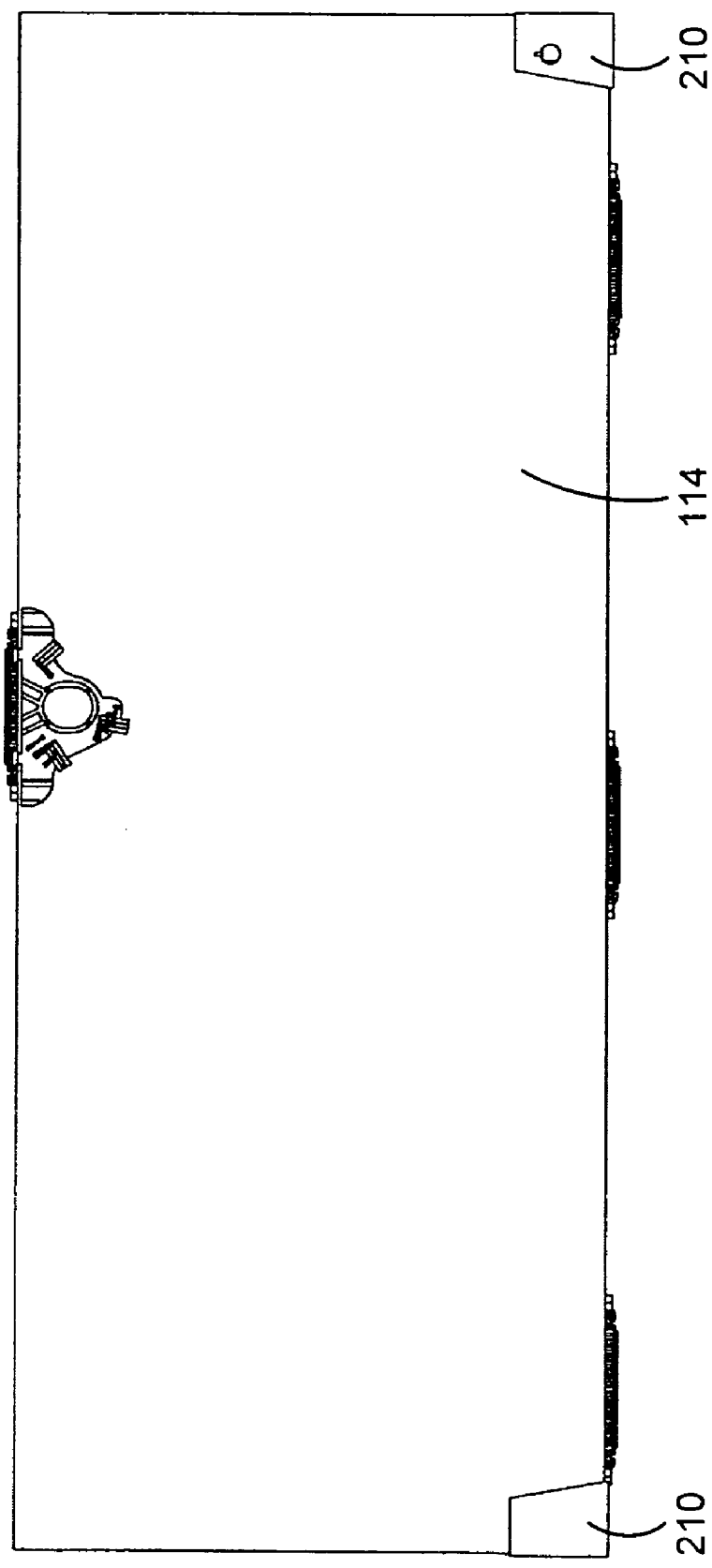

As shown in FIG. 22, support blocks 210, according to the invention, may also be utilized for supporting the door 114 in a horizontal position, if that position is preferred for positioning and utilizing the various elements of the invention.

As shown in FIG. 21, a template base, according to the invention, may also include a plurality of aligned slots 214, which are configured to receive the various components of an apparatus, according to the invention, for storage of those elements in a convenient, connected together form. Other mounting arrangements, such as specially configured recesses 216, may also be provided for holding the laser pointers 204, and mounting devices 205 used for attaching the laser pointers to the door lock hole templates 108, 110.

FIGS. 23-40 illustrate a third exemplary embodiment of an apparatus 300, and method for use thereof, in hanging a door 114, having a face 114a and an edge 114b of the door 114, in an associated door frame 115, having a face 115a and an edge 115b of the door frame. As best seen in FIG. 24, the third exemplary embodiment of the apparatus 300 includes a tool guide apparatus 301 including, a template base 302, one or more interchangeable first templates 304, 305, a second template 306, a pair of generally wedge-shaped positioning members 308, and a pair of spacers 310. The third exemplary embodiment of the apparatus of the apparatus 300 also includes a removable clamping template 312, a removable clamping flange 314, a removable clamp hand screw 316, and a detachable dead bolt lock-location guide 118.

Figure 25:
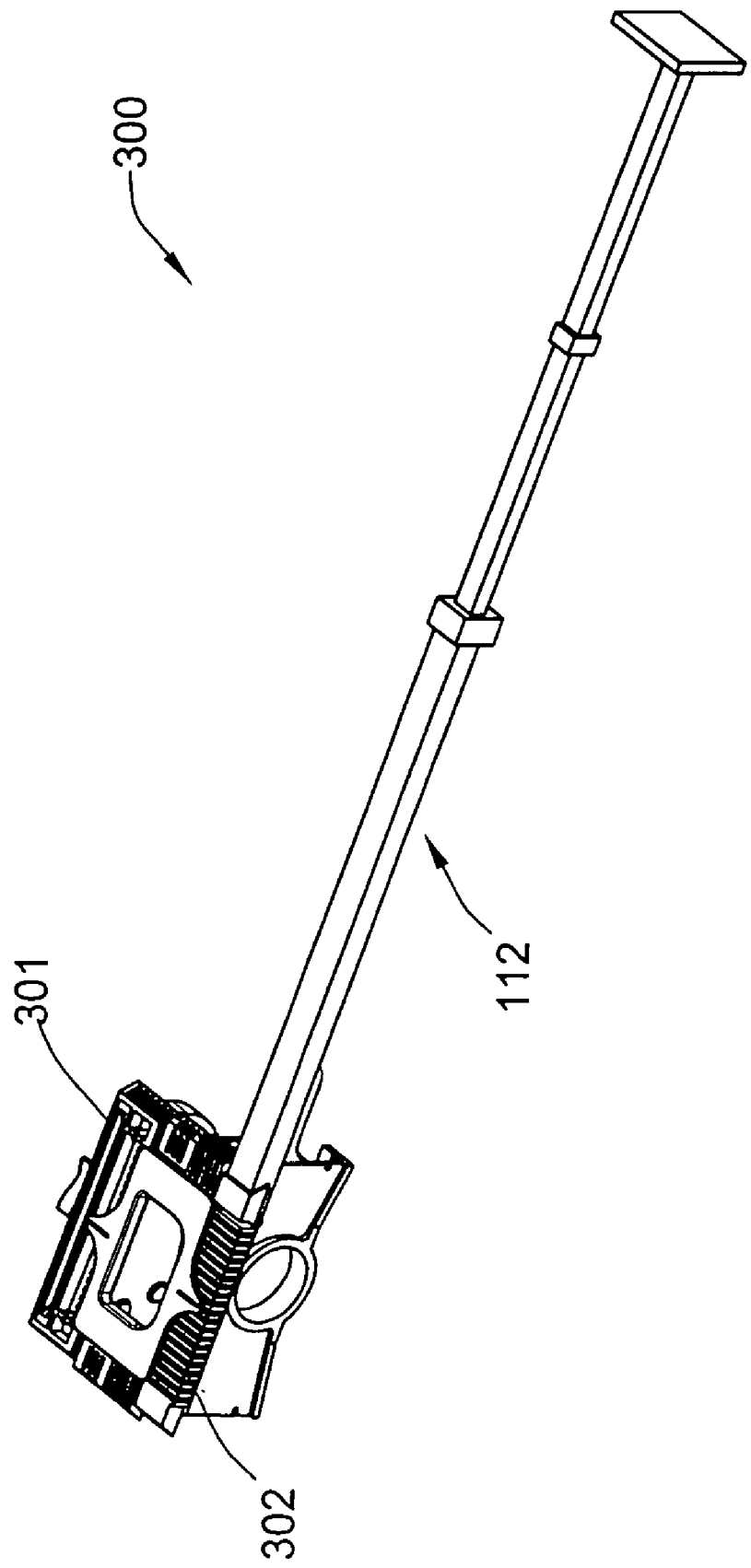
Figure 26:
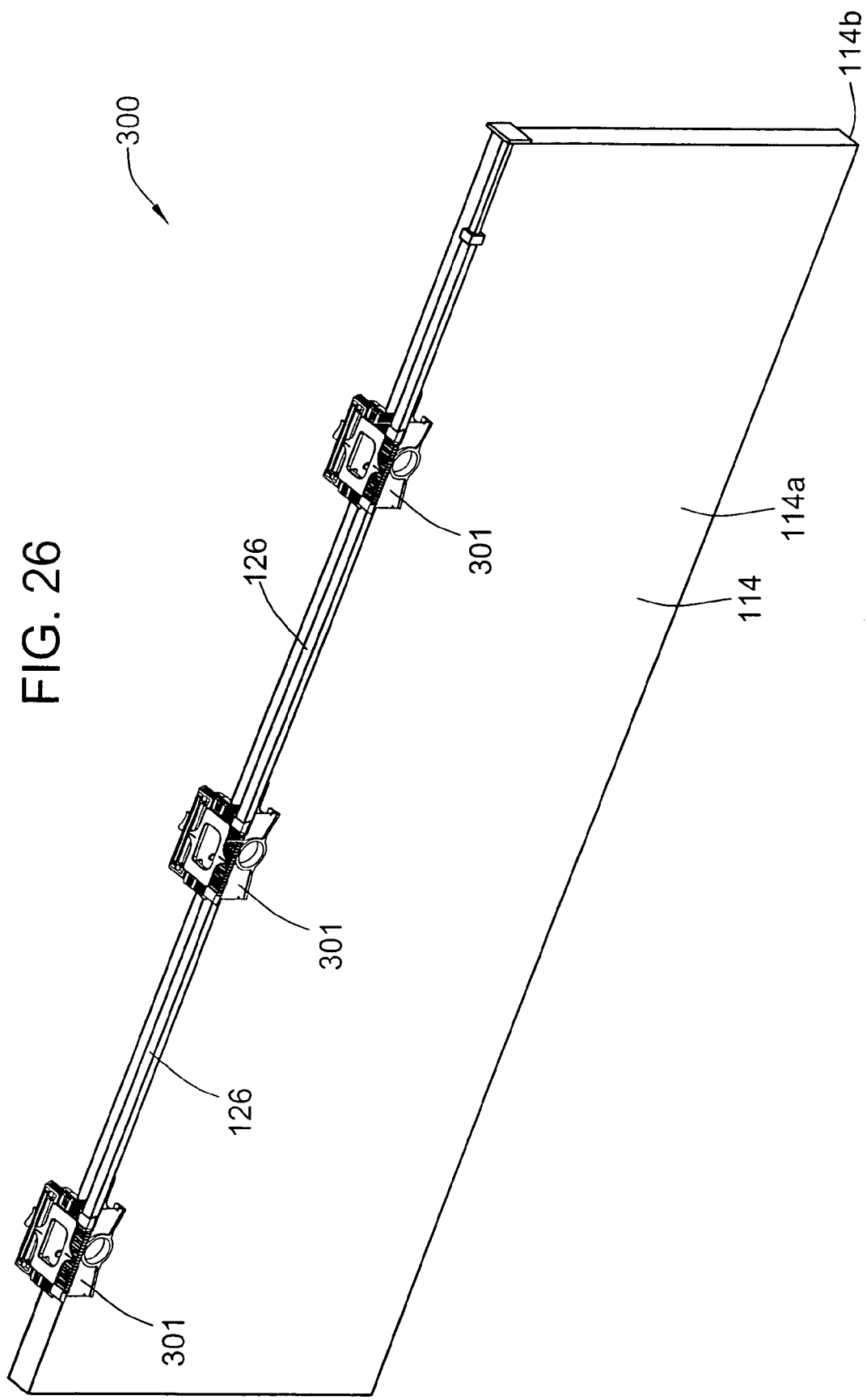

As shown in FIG. 25, the third exemplary embodiment of an apparatus 300, according to the invention, may also include an adjustable length leg 112, attached to the template base 302 in the same manner as discussed above in relation to the first exemplary embodiment of the invention. As shown in FIG. 26, the third exemplary embodiment of an apparatus 300, according to the invention, may also include multiple tool guide apparatuses 301 connected to one another by an alignment apparatus, such as the alignment apparatus 126 discussed above in relation to the first exemplary embodiment of an apparatus 100, according to the invention.

As shown in FIGS. 23, 24, 29, 31 and 33, the template base 302 has a mounting surface 320 adapted for alternatively engaging the edge 114b of the door 114 when the template base 302 is mounted on the door 114, or the face 115b of the frame 115 when the template base 302 is mounted on the door frame 115. In the tool guide apparatus 301, of the third exemplary embodiment of the apparatus 300, the second template 306 is fixedly attached to, and extends substantially perpendicularly from the template base 302, for guiding a tool engaging the face 114a of the door 114, when the template base 302 is engaging the edge 114b of the door 114. The second template 306 also includes a pair of oppositely angled inclined surfaces thereof 322, 322, configured for operatively mating with the wedge-shaped positioning members 308, in a manner described in greater detail below.

The first templates 304 or 305 are adapted for mounting, by snapping in, or otherwise being attached to the template base 302, for guiding a tool engaging the edge 114b of the door 114, when the template base 302 is mounted on the edge 114b of the door 114. When the template base 306 is mounted on the face 115a of the door frame 115, the first templates 304, 305 guide a tool engaging the face 115a of the door frame 115.

Figure 32:
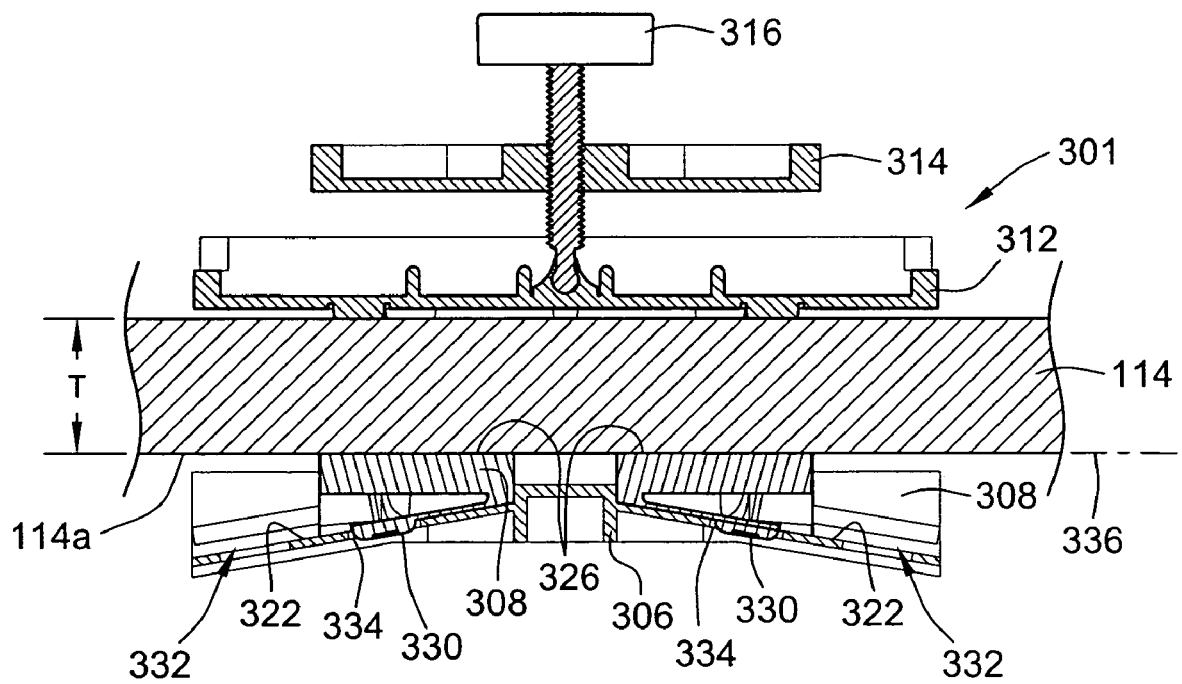
Figure 33:
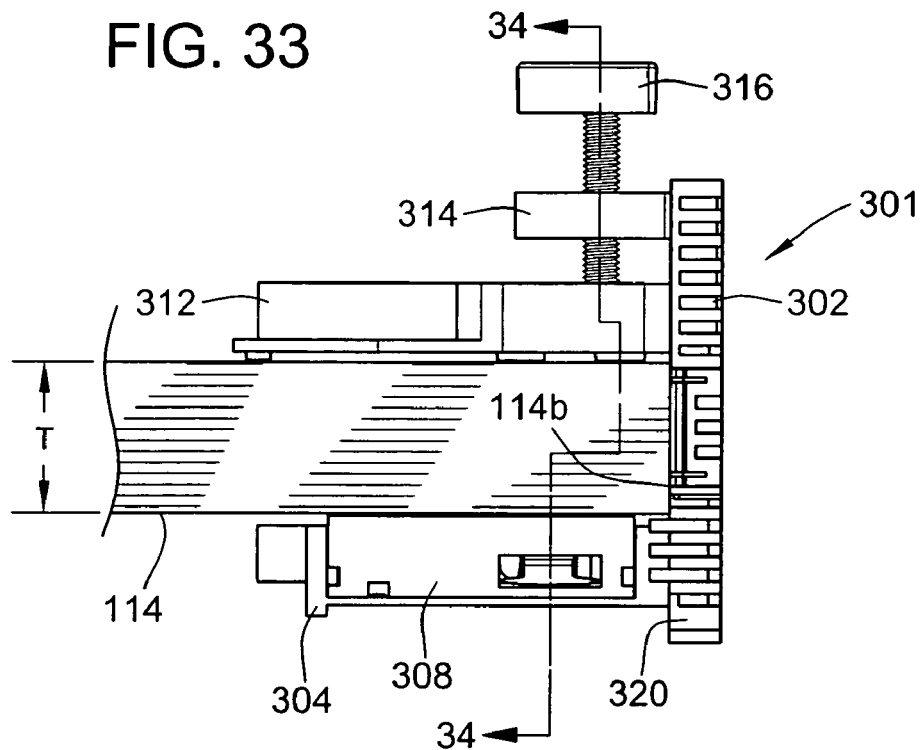
Figure 34:
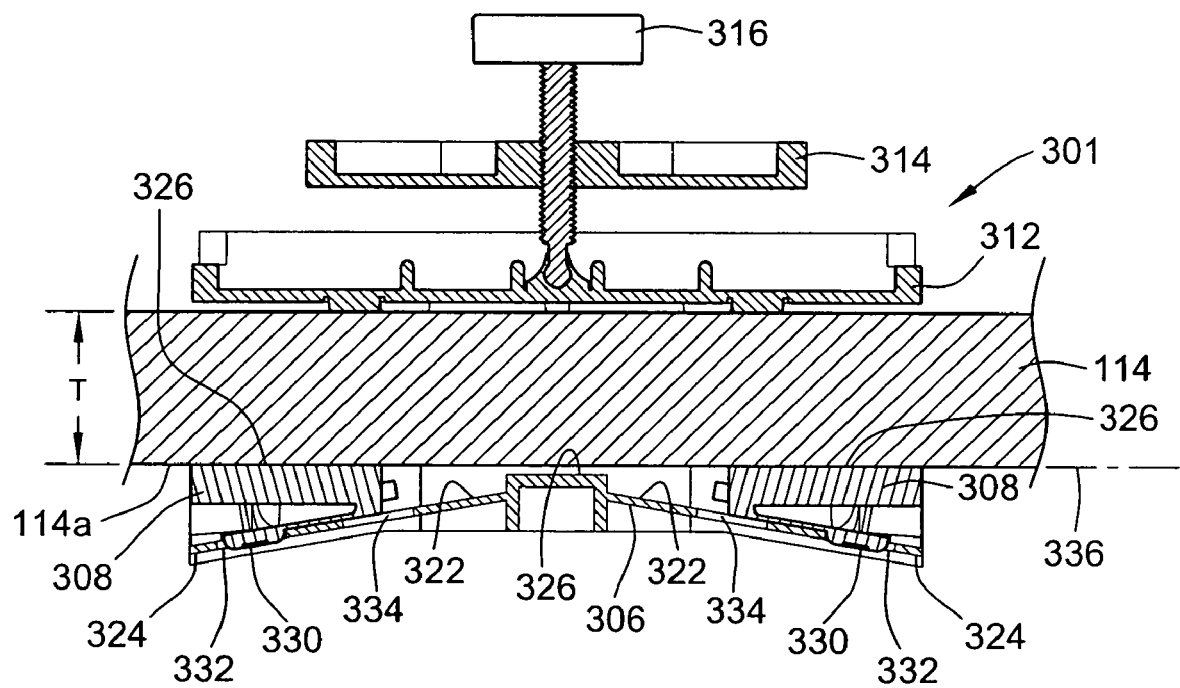

The generally wedge-shaped positioning members 308 are slideably mounted on the inclined surfaces 322, 322 of the second template 306, for movement between a first position, as shown in FIG. 34, and a second position, as shown in FIG. 32, along the inclined surfaces 322, 322. Each of the positioning members 308 have a first inclined surface 324 thereof, engaging one of the inclined surfaces 322, 322 of the second template 306, and a second non-inclined surface 326 thereof, oriented substantially perpendicular to the mounting surface 320 of the template base 302, for engaging the face 114a of the door 114 when the template base 302 is engaging the edge 114b of the door 114.

Figure 30:
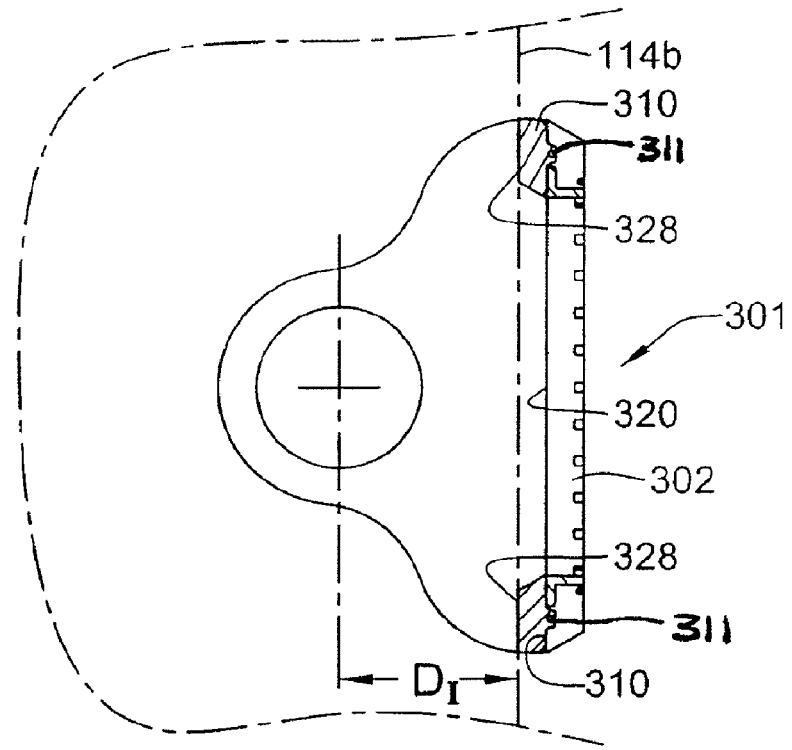
Figure 29:
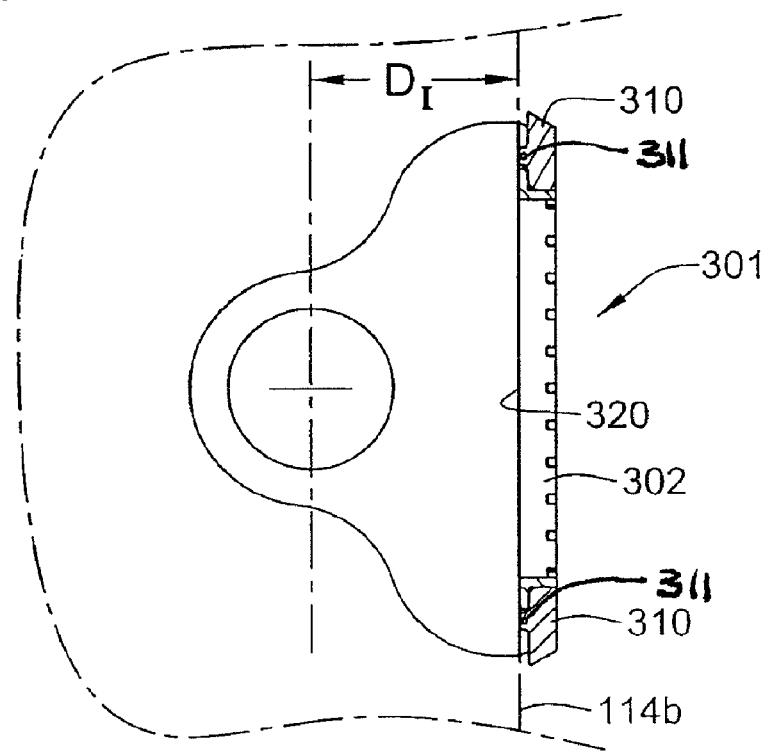
Figure 31:
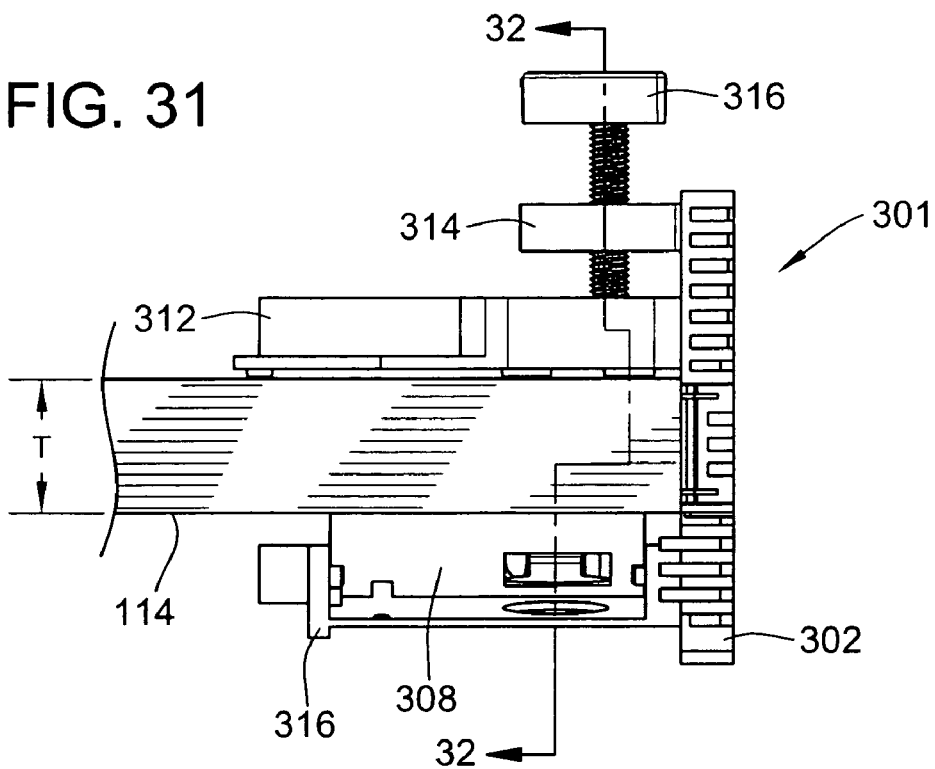

The spacers 310, 310 are mounted to the template base 302 by pivot axles 311 for pivoting movement from a first position, as shown in FIG. 29, to a second position, as shown in FIG. 30, of the spacers 310, 310. The spacers 310, 310 are configured and attached to the template base 302 by the pivot axles 311 in such a manner that when the spacers 310 are pivoted into the second position, the spacers 310 will protrude from the template base 302 and define a second mounting surface 328 of the template base 302. By virtue of the configuration and mounting of the spacers 310, 310, placing the spacers 310 in the second position moves the template base 302 farther from the door edge 114b, when the second mounting surface 328 is engaging the door edge 114b, or, when the second mounting surface 328 is engaging the face 115a of the door frame 115, placing the spacers 310 in the second position moves the template base 302 farther from the face 115a of the door frame 115. In some embodiments of the invention, the spacers 310 are configured to protrude from the template base 302, in both the first and second positions, to define both the first and second mounting surfaces 320, 328, such that the template base 302 is always spaced away from the door 114 or door frame 115 by the spacers 310. In other embodiments, the template base 302 may bear against the door 114 or door frame 115, in the first position, as shown in FIG. 29.

Figure 23:
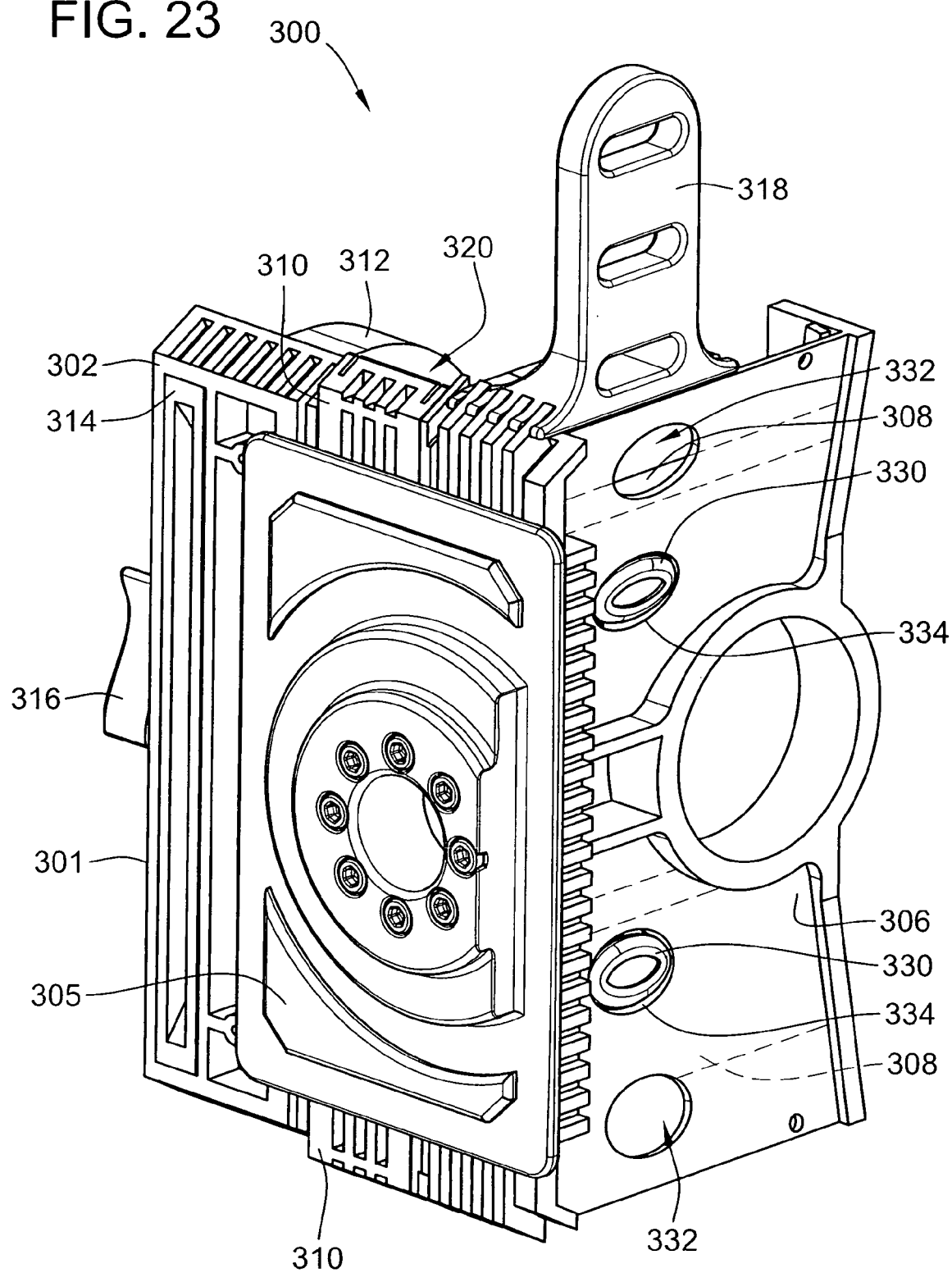
FIGS. 23-40 illustrate a third exemplary embodiment of an apparatus, according to the invention, including a template base having a mounting surface adapted for receiving a first template, and a second template integrally joined to the template base and extending substantially perpendicularly from the template base. This embodiment of the invention includes a generally wedge-shaped positioning member and a pivotable spacer for adjusting position of the apparatus relative to one or more surfaces of a door or its associated door frame. This embodiment of the invention also utilizes a number of the features specifically illustrated in FIGS. 1-22.
Figure 24:
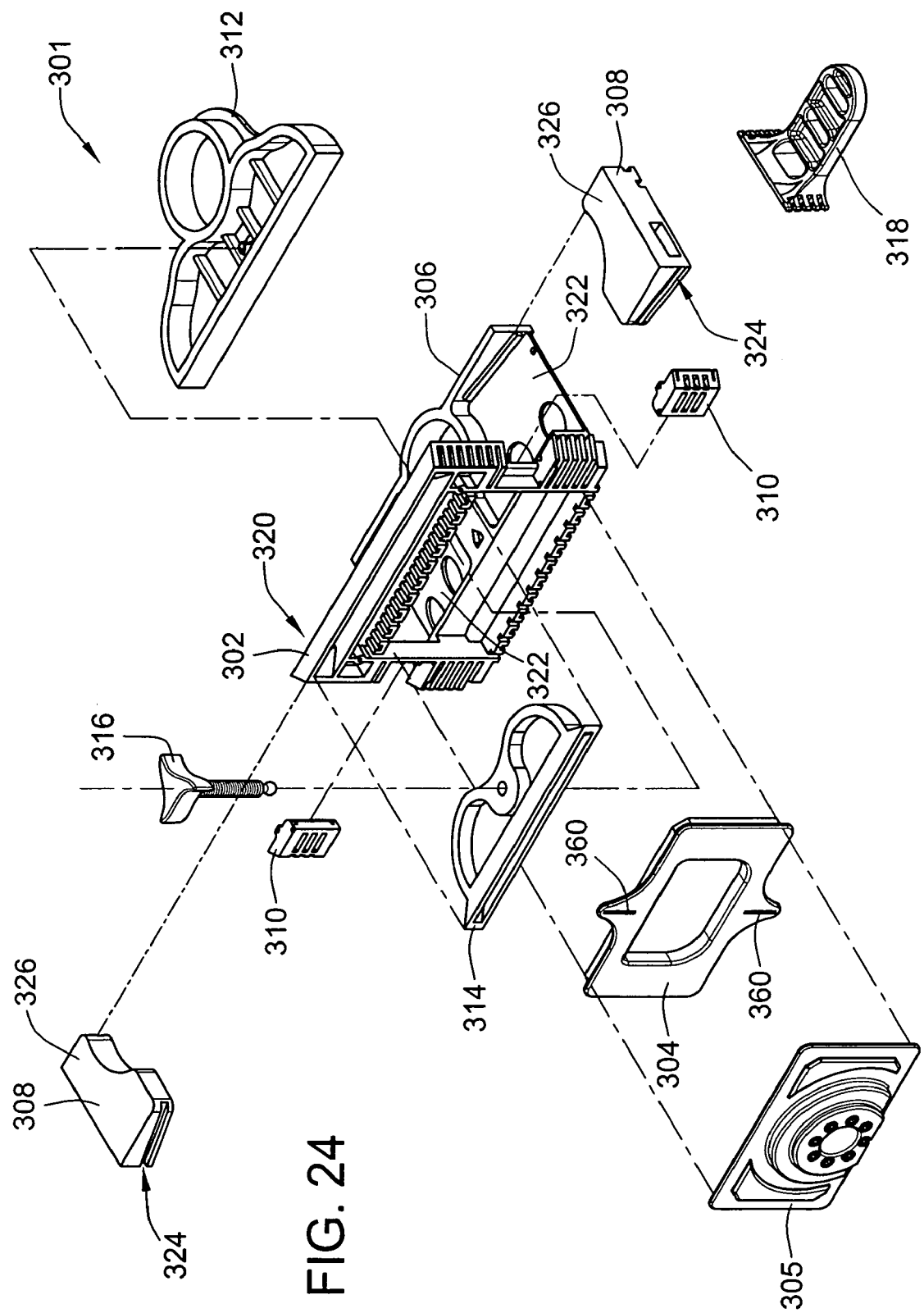

As shown in FIGS. 32, 34, and 23, the wedge-shaped positioning members 308 in the third exemplary embodiment 300 include selectively disengageable snap action latches 330, which engage holes 332 or 334 in the inclined surfaces 322 of the second template 306, for holding the positioning members 308 in either the first or the second positions. As illustrated in FIGS. 32 and 34, the wedge-shaped positioning members 308, in the third exemplary embodiment 300, are configured in such a manner that the non-inclined surfaces 326 thereof protrude from the second template 306, in both the first and second positions of the wedge-shaped positioning members 308. By virtue of this arrangement, the non-inclined surfaces 326 of the wedge-shaped positioning members 308, in combination, define a mating plane 336 adapted for engaging the door 114 and/or the door frame 115. In other embodiments of the invention, the wedge-shaped positioning members 308, and the second template 306 may be cooperatively configured such that a portion, of the second template 306, such as the portion 338 shown in FIG. 34, also forms part of the mating plane 336, when the wedge-shaped positioning members 308 are in the first position along the inclined surfaces 322 of the second template 306.

Figure 36:
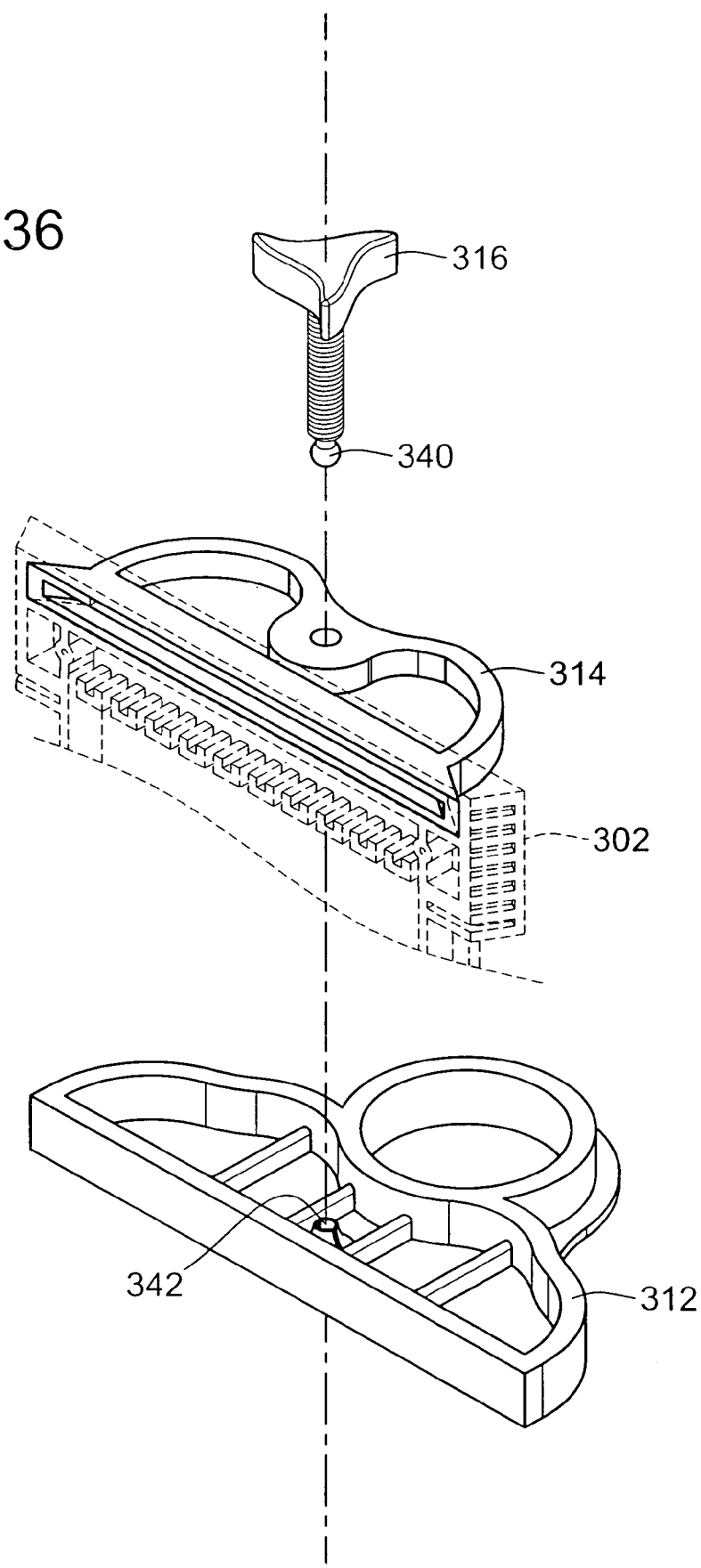

For forming lock set holes in the door 114, the tool guide apparatus 301 of the third exemplary embodiment of an apparatus 300, according to the invention, is assembled substantially as shown in FIG. 23. If only a single lock set is to be accommodated in the door, the detachable dead bolt lock-locating guide 318 may be removed from the remainder of the tool guide apparatus 300. Specifically, in preparation for forming holes to accommodate a lock set in the door 114, the removable clamping flange 314 is installed into its mating slot in the template base 302, as indicated in FIGS. 23 and 36. The removable clamp hand screw 316 is then threaded through the removable clamping flange 314, and a pivot ball 340, forming the distal end of the removable clamp hand screw 316, is snapped into a pivot ball retaining socket 342 of the removable clamping template 312. An appropriate template insert, such as the insert 305 shown in FIG. 24, is inserted into the template base 302, for guiding a tool in forming the latch bolt hole in the edge 114b of the door 114.

Figure 35:
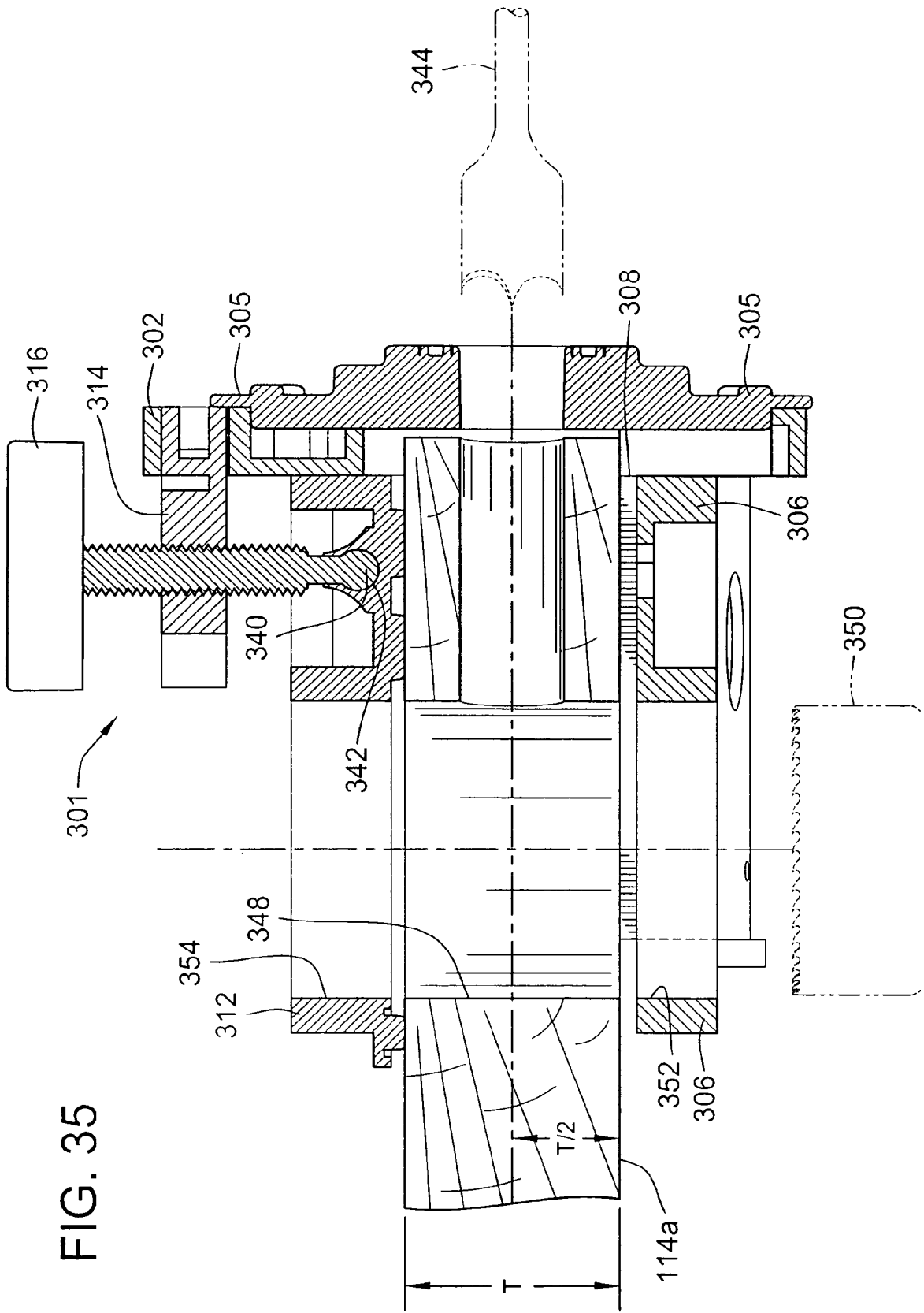

The wedge-shaped positioning members 308 are then appropriately positioned along the inclined surfaces 322 of the second template 306, such that, when the tool guide apparatus 31 is clamped onto the door in the manner illustrated in FIGS. 31-35, the template insert 305 will guide a tool, such as the spade drill bit 344 shown in FIG. 35, into the edge 114b of the door 114 at a distance T/2 which is half of the thickness T of the door 114, such that the bolt passage hole 346 is centered in the thickness T of the door 114. The wedge-shaped positioning members 308, in combination with the inclined surfaces 322, therefore provide a convenience way for quickly adjusting the tool guide apparatus 301 to accommodate two door thicknesses, such as the 1⅜" or 1¾" thickness commonly used in residential and commercial construction.

Prior to actually clamping the tool guide apparatus 301 in place on the door 114, the spacers 310 are also placed in the appropriate first or second position, as shown in FIGS. 29 and 30, to achieve a desired standard inset distance $D_1$ for the centerline of the lock handle, or other actuating mechanism, from the edge 114b of the door 114.

Figure 38:
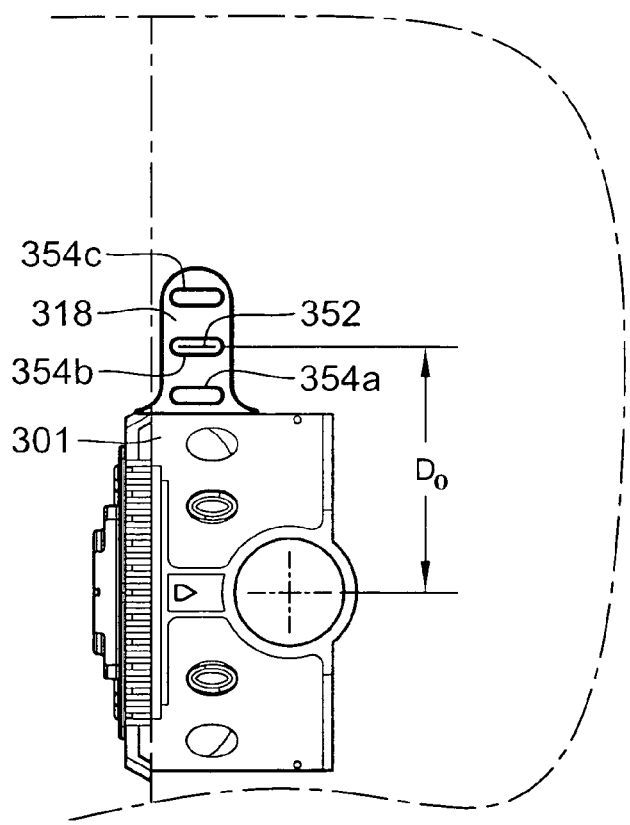

The tool guide apparatus 301 is then clamped onto the door 114, with the mating plane 336 formed by the wedge-shaped positioning members 308 bearing against the face 114a of the door, and the first or second mounting surface 320, 328, formed by the spacers 310 and/or the template base 302 contacting the edge 114b of the door through which the latch portion of the lock set is to extend for contact with the strike plate in the door frame 115. The vertical position of the tool guide apparatus 301 along the door 114 may be set using a tape measure, or through use of an adjustable length leg 112, and/or alignment apparatus 126, in accordance with the invention, as described herein above. The lock mechanism passage hole 348, and the intersecting bolt passage hole 346, for receiving the lock set therein, may then be formed in the door 114 using appropriate tools such as the spade drill bit 344 and hole saw 350, as illustrated in FIG. 35. It will be noted, that the removable clamping template 312 and the second template 306, in the exemplary embodiment of the tool guide apparatus 301, according to the invention, both include aligned guide holes 352, 354, so that the hole saw 350 may either pass completely through the door 114 and the tool guide apparatus 301 from either direction, or, preferably, the hole saw 350 may be alternately first inserted through one side and then the other of the tool guide apparatus 301 in forming the lock mechanism passage hole 348, to preclude splintering of the surface of the door as the hole saw 350 exits after penetrating the thickness T of the door 114.

Where it is desired to install both a passage lock set, and a dead bolt lock set in the door 114 at an offset distance $D_O$ above the passage lock set, the detachable dead bolt lock-location guide 318 may be attached to the top of the tool guide apparatus 301, in the manner shown in FIG. 38, and used for marking a reference line 352, through a selected one of several slots 354a, 354b, 354c, which extend through the detachable dead bolt lock-location guide 318 at positions which will indicate one of three standard offset distances $D_O$ above the horizontal center line of the passage lock set. The removable clamp hand screw 316 is then loosened enough that the tool guide apparatus 301 can be repositioned above the passage lock set hole, for forming a second set of holes in the door 114 to receive the dead bolt lock.

Figure 37:
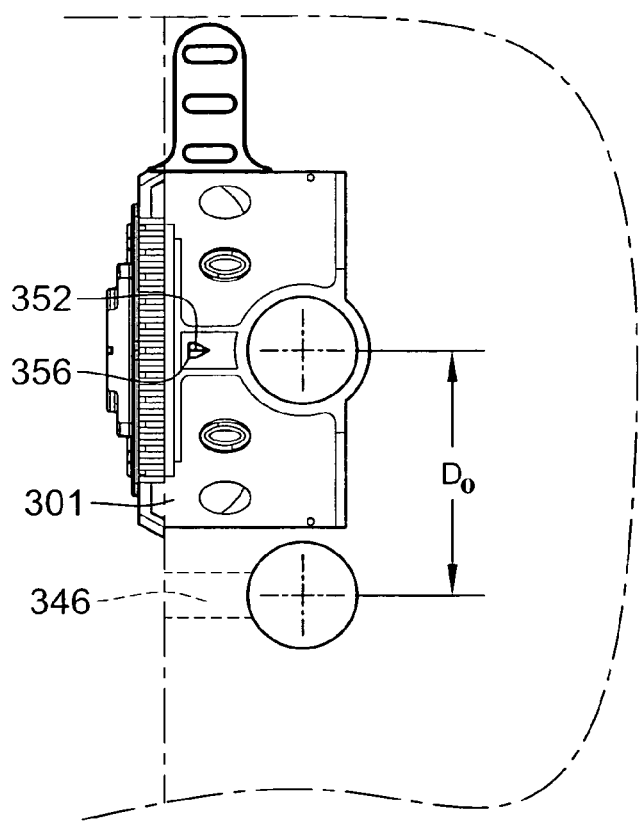

As shown in FIG. 37, the second template 306 of the tool guide apparatus 301 includes a V-shaped notch 356 therein, which can be aligned with the reference line 352, formed when the tool guide apparatus 301 is positioned as shown in FIG. 38, for conveniently repositioning the tool guide apparatus 301 at the desired distance $D_O$ above the holes in the door formed for the passage lock set. The removable clamp hand screw 316 is then re-tightened, to hold the tool guide apparatus 301 in place on the door 114 while the hole saw 350 and spade bit 344 are used to form holes 346, 348 for the dead bolt lock set.

Figure 39:
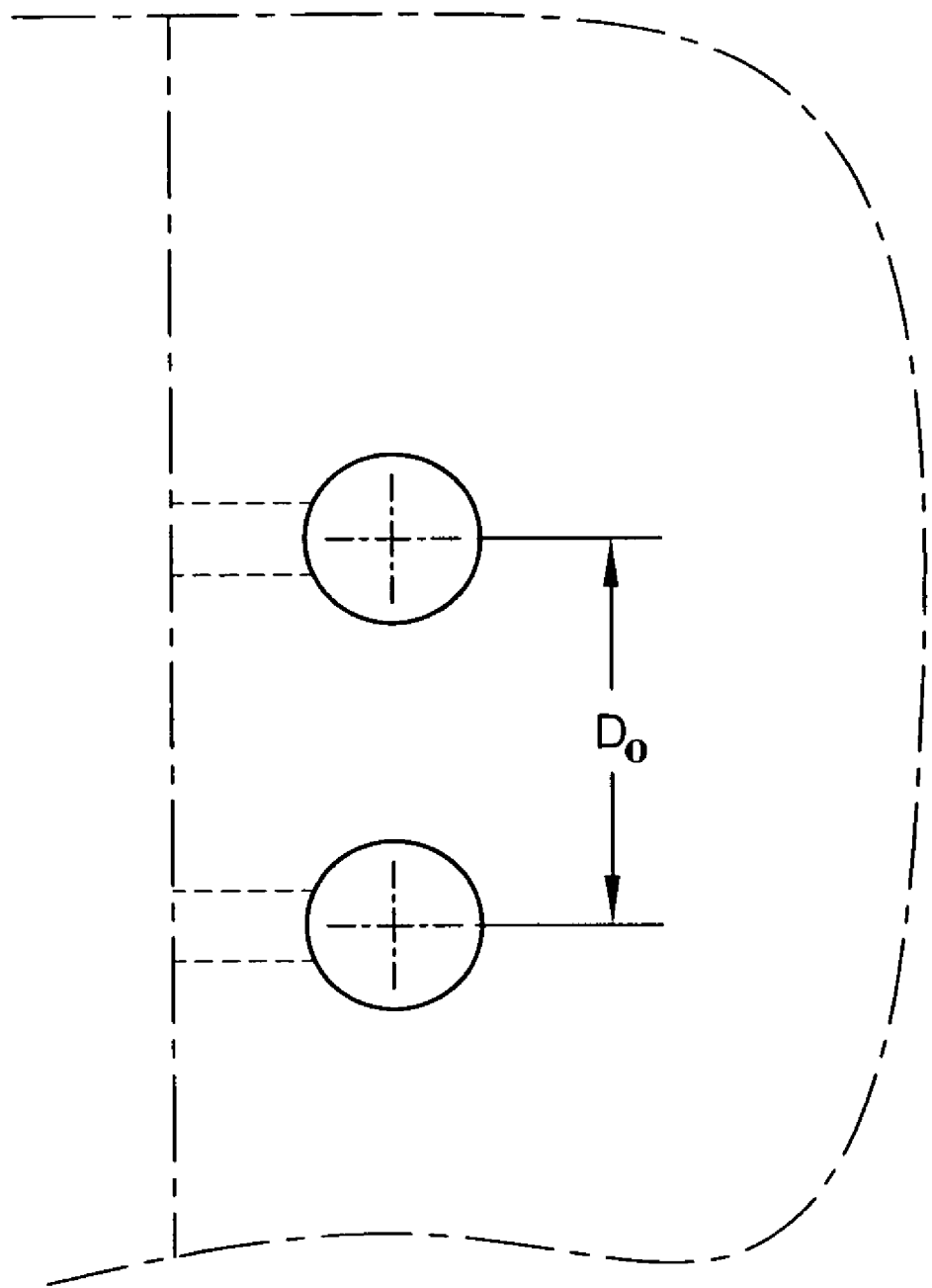

After the appropriate holes 346, 348 are formed for the dead bolt lock set, the tool guide apparatus 301 is removed from the door 114, leaving properly positioned and spaced holes for both the passage and dead bolt lock sets, as illustrated in FIG. 39.

Figure 40:
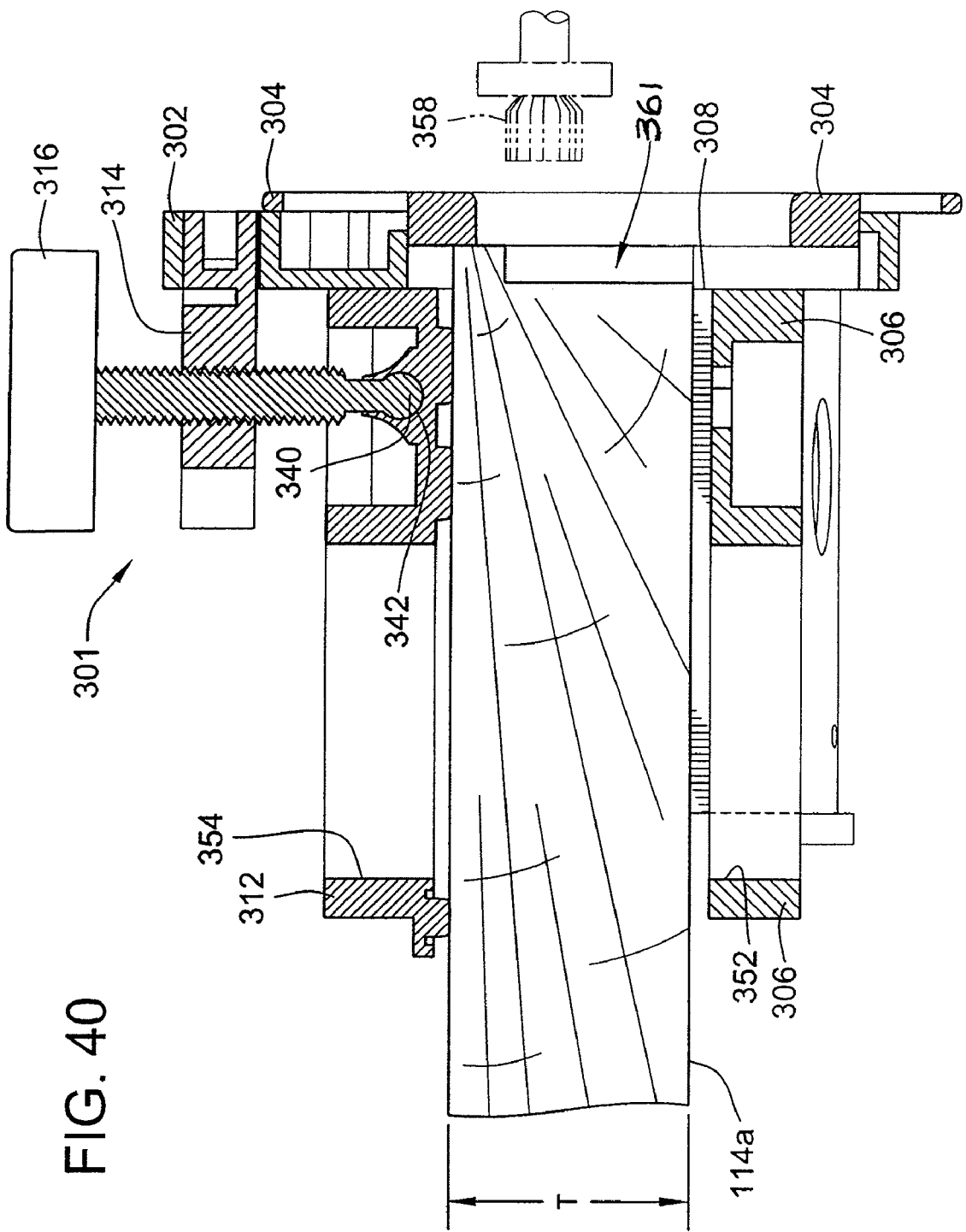

In order to form mortises on the hinge-side of the door 114 for the door half of leaf hinges used to attached the door 114 to the frame 115, the template insert 305, used for forming the lock hole 346, is replaced with the template 304, and the tool guide apparatus 301 is attached to the door 114 along the hinge-side edge of the door 114, in the manner illustrated in FIG. 40. For a given door, the settings of the wedge-shaped positioning members 308 may remain the same for attaching in the tool guide apparatus 301 to either edge of the door 114. In preferred embodiments of the invention, the template insert 304 is configured in such a manner that it will control the depth of the mortise 361 without having to change the position of the spacers 310. In some embodiments of the invention, however, the spacers 310 may be utilized, in conjunction with a series of templates 304 to provide various depth settings for the mortise 361. With the tool guide apparatus 301 attached to the door 114, in the manner illustrated in FIG. 40, an appropriate tool, such as a router bit 358 with a guide collar, as shown in FIG. 40, may be utilized in conjunction with the template 304 for forming the mortise 361 in the hinge-side edge of the door 114.

Figure 27:
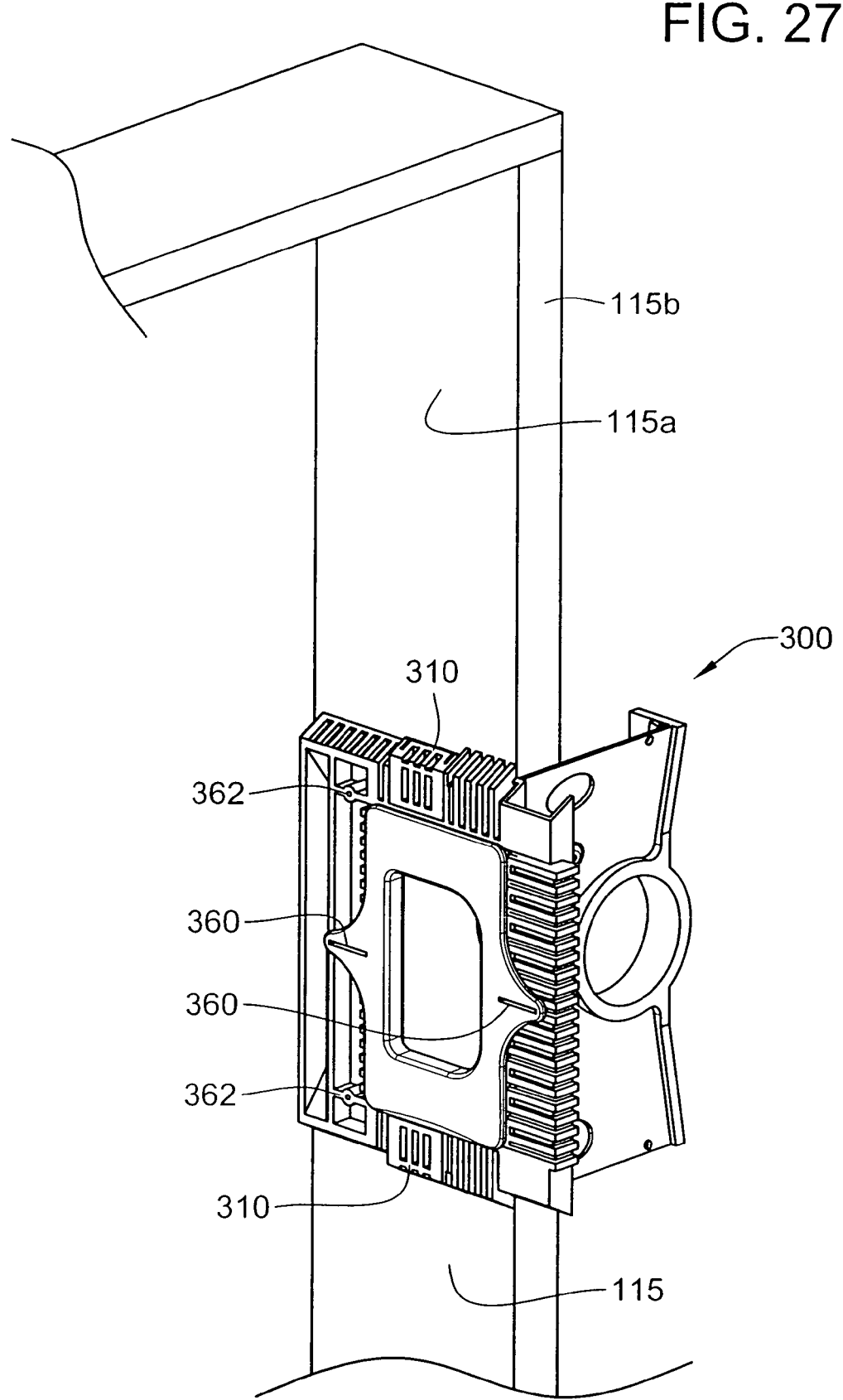
Figure 28:
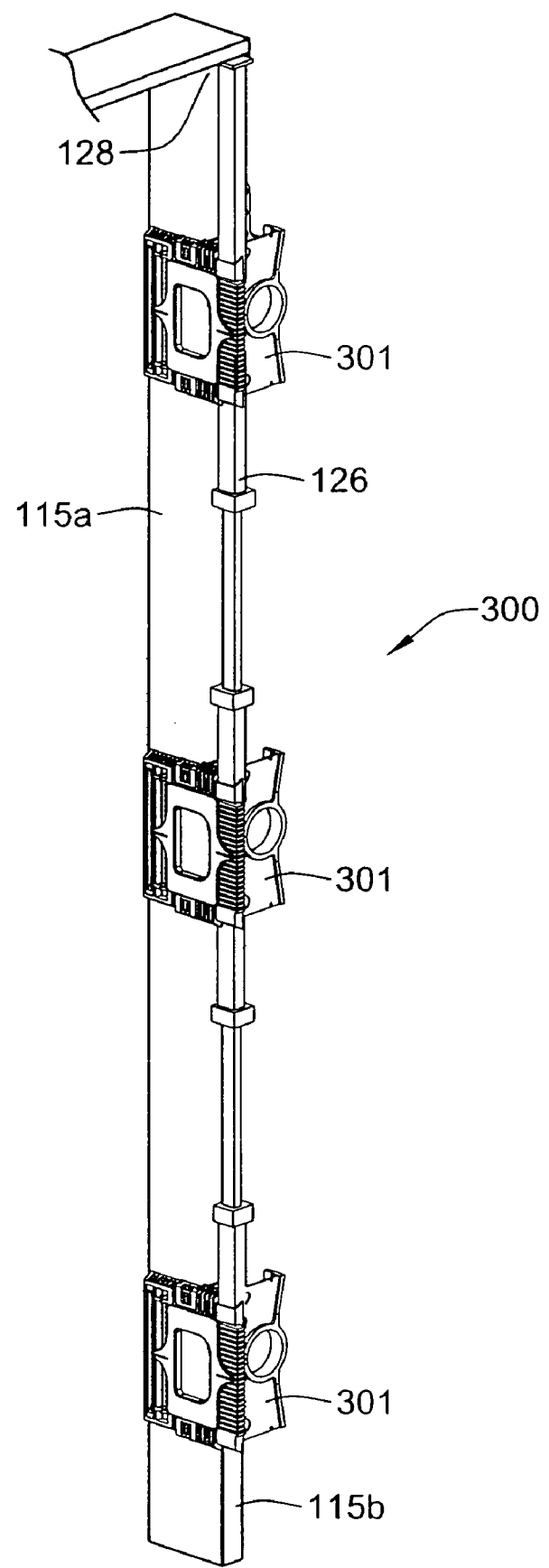

The vertical position of the tool guide apparatus 301, along the hinge-side of the door, may be set manually using a tape measure, or may be set through use of an adjustable length leg 112 and/or an alignment apparatus 126, according to the invention, as described herein above. To facilitate vertical positioning of the tool guide apparatus 301 on either the door 114, or in the door frame 115, template inserts, according to the invention, may include a slot 360, for receipt therein of the hook at the end of a tape measure blade, as illustrated in FIGS. 24 and 27. It will be noted that, although the slots 360 are only illustrated in the insert 304, of the exemplary embodiments described herein, the slots 360 may also be included in other template inserts, such as the template insert 305 of the exemplary embodiment shown herein.

For forming mortises in the face 115a of the frame 115, the removable clamping template 312, clamp hand screw 316, and clamping flange 314 are removed from the tool guide apparatus 301. The tool guide apparatus 301, with an appropriate template insert 304, for forming a mortise in the door frame 115, is appropriately positioned and attached to the door frame 115 in the manner illustrated in FIGS. 27 and 28. When forming the mortises, in the face 115a of the door frame 115, the first or second mounting surfaces 320, 328 of the spacers 310 are placed into contact with the face 115a of the door frame, and the non-inclined surfaces 326 of the wedge-shaped positioning members 308 are placed into contact with the edge 115b of the door frame 115.

The vertical position of the tool guide apparatus 301, along the door frame 115, can be established manually, by using a tape measure, for example, with the tool guide apparatus 301 being held in place along the door frame 115 by nails (not shown) temporarily driven through holes 362 in the template base 302. Once one of the mortises is formed, the nails may be removed and the tool guide apparatus 301 repositioned and reattached at other appropriate locations along the frame 115, matching the corresponding mortise locations on the hinge-side of the door 114. Alternatively, multiple tool guide apparatuses 301 may be positioned within the door frame 115, utilizing an alignment apparatus, such as the alignment apparatus 126 described herein above. It will be noted, that through use of the various aspects of the invention, multiple tool guide apparatuses 301, joined together by an alignment apparatus 126, according to the invention, may be utilized for conveniently transferring the mortise locations from the door 114 to the frame 115, without adjusting the relative locations of the tool guide apparatuses 301 on the alignment apparatus 126, other than removal of the clamping template 312, clamping flange 314 and hand screw 316, in transferring the tool guide apparatuses 301 from the edge of the door 114 to the door frame 115.

An apparatus, according to the invention, may take many forms, including all or only selected components of the invention. It is also contemplated that the invention may be supplied in various kits, including some or all of the components of an apparatus as described above. Such a kit may include a carrying case adapted for storage and transport of an apparatus according to the invention.

It is also expressly noted that, although the exemplary embodiments described herein included only templates and/or template inserts for forming holes and mortises in doors and door frames associated with installation of lock sets and hinges, in other embodiments of the invention, additional templates may be provided for forming such mortises, holes, etc., as may be required for installation of a wide variety of functional and decorative hardware, associated with a door, including, but not limited to: passage lock sets; dead bolt lock sets; hinges; strike plates; attachment plates; and escutcheons or other decorative elments. For example, in the third exemplary embodiment of an apparatus 300, according to the invention, the tool guide apparatus 301 may include additional template inserts (i.e. more than just the inserts 304 and 305 shown in the drawings and described above) for forming features such as, but not limited to: mortises in the face of the door frame, for receiving a latch strike plate; a mortise in the edge 114b of the door 114 around the lock bolt passage hole 346, for receiving an attachment plate or escutcheon; and for other holes and mortises related to attachment of both functional and decorative door hardware. Such additional templates and/or inserts may also be provided for use, in accordance with the invention, for practicing other embodiments of an apparatus and/or a method, according to the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for hanging a door, having a face and an edge of the door, in an associated door frame, having a face and an edge of the door frame, the apparatus comprising:
    a template base having a mounting surface adapted for alternatively engaging the edge of the door when the template base is mounted on the door, and the face of the frame when the template base is mounted on the door frame;
    a first template adapted for mounting on the template base, for guiding a tool engaging the edge of the door, when the template base is mounted on the edge of the door, and for guiding a tool engaging the face of the door frame, when the template base is mounted on the face of the door frame;
    a second template extending substantially perpendicularly from the template base, for guiding a tool engaging the face of the door, when the template base is engaging the edge of the door;
    the second template being fixedly attached to the template base and including an inclined surface; and
    a generally wedge-shaped positioning member slidably mounted on the inclined surface for movement between a first and a second position along the inclined surface;
    the positioning member having a first inclined surface thereof engaging the inclined surface, and a second non-inclined surface thereof oriented substantially perpendicular to the mounting surface of the template base, for engaging the face of the door when the template base is engaging the edge of the door.

2. The apparatus of claim 1, wherein, the first template includes a turn-lock fastener, and the template base includes a mating receptacle for the turn lock fastener, for securing the first template to the template base.

3. The apparatus of claim 1, further comprising, multiple first and/or second templates, with the multiple templates and template base being cooperatively configured in such a manner that all of the multiple templates snap into the template base for convenient stowage of the apparatus.

4. The apparatus of claim 1, further comprising a door support, having a groove therein for receiving an edge of the door, to thereby support the door in a substantially vertical position to facilitate formation of mortises and/or holes in the door and its associated door frame, during hanging of the door.

5. The apparatus of claim 1, wherein, at least one of the first or second templates includes a slot therein for receiving the hooked end of a tape measure, to thereby facilitate positioning of the template base.

6. The apparatus of claim 1, further comprising, an alignment apparatus for positioning the template base on the door or the door frame.

7. The apparatus of claim 6, wherein, the alignment apparatus comprises an interconnecting bar device which is selectively extendable and includes a stop for aligning the template base on the door and the door frame.

8. The apparatus of claim 1, further comprising:
    multiple template bases together with their associated first and second templates; and
    an alignment apparatus for positioning the multiple template bases with respect to one another, and either the door or the frame, respectively, when the multiple template bases are attached to the door or the door frame.

9. The apparatus of claim 8, wherein, the alignment apparatus comprises an interconnecting bar device.

10. The apparatus of claim 9, wherein, the interconnecting bar device is selectively extendable.

11. The apparatus of claim 10, wherein, the interconnecting bar device includes a stop for aligning the template bases on the door or the door frame.

12. An apparatus for hanging a door, having a face and an edge of the door, in an associated door frame, having a face and an edge of the door frame, the apparatus comprising:
multiple template bases each having associated first and second templates; and
an alignment apparatus for positioning the multiple template bases with respect to one another, and either the door or the frame, respectively, when the multiple template bases are attached to the door or the door frame;
each template base of the multiple template bases having a mounting surface thereof adapted for alternatively engaging the edge of the door when the template base is mounted on the door, and the face of the frame when the template base is mounted on the door frame;
the first template associated with each particular template base being adapted for mounting on its associated particular template base, for guiding a tool engaging the edge of the door, when the associated particular template base is mounted on the edge of the door, and for guiding a tool engaging the face of the door frame, when the associated particular template base is mounted on the face of the door frame; and
the second template associated with each particular template being attached to and extending substantially perpendicularly from its particular associated template base, for guiding a tool engaging the face of the door, when the particular associated template base is engaging the edge of the door;
the alignment apparatus including one or more lasers for positioning the multiple template bases relative to one another.

13. The apparatus of claim 12, wherein, at least one of the multiple template bases includes a fiber optic receiver which is illuminated when the template base to which the receiver is attached is properly positioned relative to another of the multiple template bases.

14. The apparatus of claim 12, wherein, one or more of the lasers is movably attached to one of the template bases, or to one of the templates, and the template base or template to which the movable laser is attached includes indicia for aligning the laser.

15. The apparatus of claim 14, wherein, the door defines a transverse width thereof extending from a hinge edge of the door to a lock-set edge of the door, and the indicia include markings for aligning the laser to position the multiple templates relative to one another on doors of different widths.

16. The apparatus of claim 1, wherein, the positioning member includes a selectively disengagable snap-action latch for holding the positioning member in the first and second positions.

17. The apparatus of claim 1, wherein, movement of the positioning member along the inclined surface moves the second template toward or away from the face of the door, when the non-inclined surface of the positioning member is in engagement with the face of the door.

18. The apparatus of claim 1, wherein, movement of the positioning member along the inclined surface moves the first template laterally across the edge of the door, when the non-inclined surface of the positioning member is in engagement with the face of the door.

19. The apparatus of claim 1, further comprising, a spacer pivotably mounted to the template base for selective movement between a first and a second position, the spacer being configured and attached to the template base in such a manner that when the spacer is pivoted into the second position, the spacer will protrude from the template base and define a second mounting surface of the template base, to thereby move the template base farther from the door edge, when the second mounting surface is engaging the door edge, or for moving the template base farther from the face of the door frame, when the second mounting surface is engaging the face of the door frame.

20. The apparatus of claim 1, wherein:
the first and second templates include openings therein for guiding tools forming intersecting first holes in the door edge and door face, respectively, for installation of a lock-set, with the second template also including an alignment opening extending therethrough, for marking a first vertical location of the apparatus on the door and door frame; and
the apparatus further comprises, a deadbolt lock location guide, for facilitating marking of a desired vertical spacing for the deadbolt lock relative to the alignment opening in the second template.

21. The apparatus of claim 20, wherein the deadbolt lock location guide includes indicia for marking two or more desired vertical spacings for the deadbolt lock relative to the alignment opening in the second template.

22. The apparatus of claim 21, wherein the deadbolt lock location guide is detachable from the template base and first and second templates.

23. An apparatus for hanging a door, having a face and an edge of the door, in an associated door frame, having a face and an edge of the door frame, the apparatus comprising:
a template base having a mounting surface adapted for alternatively engaging the edge of the door when the template base is mounted on the door, and the face of the frame when the template base is mounted on the door frame;
a first template adapted for mounting on the template base, for guiding a tool engaging the edge of the door, when the template base is mounted on the edge of the door, and for guiding a tool engaging the face of the door frame, when the template base is mounted on the face of the door frame;
a second template fixedly attached to and extending substantially perpendicularly from the template base, for guiding a tool engaging the face of the door, when the template base is engaging the edge of the door, the second template also including an inclined surface thereof;
a generally wedge-shaped positioning member slidably mounted on the inclined surface of the second template for movement between a first and a second position along the inclined surface, with the positioning member having a first inclined surface thereof engaging the inclined surface, and a second non-inclined surface thereof oriented substantially perpendicular to the mounting surface of the template base, for engaging the face of the door when the template base is engaging the edge of the door; and
a spacer mounted to the template base for pivoting movement from a first to a second position of the spacer, the spacer being configured and attached to the template base in such a manner that when the spacer is pivoted into the second position, the spacer will protrude from the template base and define a second mounting surface of the template base, to thereby move the template base farther from the door edge, when the second mounting surface is engaging the door edge, or to thereby move the template base farther from the face of the door frame, when the second mounting surface is engaging the face of the door frame.

24. The apparatus of claim 23, wherein, the positioning member includes a selectively disengagable snap-action latch for holding the positioning member in the first and second positions.

25. The apparatus of claim 23, wherein, movement of the positioning member along the inclined surface moves the second template toward or away from the face of the door, when the non-inclined surface of the positioning member is in engagement with the face of the door.

26. The apparatus of claim 23, wherein, movement of the positioning member along the inclined surface moves the first template laterally across the edge of the door, when the non-inclined surface of the positioning member is in engagement with the face of the door.

27. A method for hanging a door having a surface thereof, in an associated door frame having a surface thereof, the method comprising:
positioning a template of a door hanging apparatus with respect to the surface of the door and/or frame, for forming a mortise and/or hole in the surface of the door and/or frame, using a wedge-shaped positioning member of the hanging apparatus for adjusting the template positionaly with respect to one of the surface of the door and the frame:
wherein, the positioning member has an inclined surface configured for engaging a complimentary inclined surface of the door hanging apparatus and a non-inclined surface configured for engaging the surface of the one of the door and the frame:
by placing the positioning member between the door hanging apparatus and the surface of the door with the inclined surface of the positioning member engaging the complimentary inclined surface of the door hanging apparatus and the non-inclined surface of the positioning member engaging the one of the surface of the door and the frame.

28. The method of claim 27, further comprising, moving the template toward or away from the surface of the door and/or the surface of the frame, by moving the positioning member along the inclined surface of the door hanging apparatus, and bringing the non-inclined surface of the positioning member into engagement with the face of the door.

29. The method of claim 27, wherein, the door includes a second surface thereof extending substantially perpendicular to the first surface thereof, the door frame includes a second surface thereof extending substantially perpendicular to the first surface thereof, and the method further comprises, moving the template across the second surface of the door and/or the second surface of the door frame, by moving the positioning member along the inclined surface, and bringing the non-inclined surface of the positioning member into engagement with the respective first surface of the door and/or the first surface of the door frame.

30. The method of claim 29, further comprising, adjusting the position of the template with respect to the second surface of the door and or door frame using a spacer mounted on the apparatus for pivoting movement from a first to a second position of the spacer, the spacer being configured and attached to the apparatus in such a manner that when the spacer is pivoted into the second position, the spacer will protrude in a manner moving the template farther from the second surface, when the spacer is engaging the second surface.

31. The method of claim 29, further comprising, moving the template across the first surface of the door and/or the first surface of the door frame, by moving the spacer into contact with the respective second surface of the door and/or the second surface of the door frame.

* * * * *